US012450779B1

(12) United States Patent
Sorgi

(10) Patent No.: US 12,450,779 B1
(45) Date of Patent: Oct. 21, 2025

(54) SYSTEM FOR DETECTING CORNERS OF AN OPTICAL TAG

(71) Applicant: AMAZON TECHNOLOGIES, INC., Seattle, WA (US)

(72) Inventor: Lorenzo Sorgi, Berlin (DE)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 18/946,239

(22) Filed: Nov. 13, 2024

Related U.S. Application Data

(62) Division of application No. 17/936,839, filed on Sep. 29, 2022, now Pat. No. 12,217,461.

(51) Int. Cl.

| | |
|---|---|
| ***G06T 7/90*** | (2017.01) |
| ***G06K 7/14*** | (2006.01) |
| ***G06K 19/06*** | (2006.01) |
| ***G06T 7/13*** | (2017.01) |
| ***G06T 7/73*** | (2017.01) |

(52) U.S. Cl.
CPC .............. *G06T 7/90* (2017.01); *G06K 7/1417* (2013.01); *G06K 19/06037* (2013.01); *G06K 19/0614* (2013.01); *G06T 7/13* (2017.01); *G06T 7/73* (2017.01); *G06K 2019/06225* (2013.01); *G06T 2207/10024* (2013.01); *G06T 2207/30244* (2013.01)

(58) Field of Classification Search
CPC ........... G06K 7/1417; G06K 19/06037; G06K 19/0614; G06K 2019/06225
USPC ....................... 235/462.01, 462.04, 469, 494
See application file for complete search history.

(56) References Cited

U.S. PATENT DOCUMENTS 12,217,461 B1 * 2/2025 Sorgi ............... G06K 19/06037
2007/0278303 A1 * 12/2007 Cattrone .......... G06K 19/06009
235/494

* cited by examiner

*Primary Examiner* — Suezu Ellis
(74) *Attorney, Agent, or Firm* — Lindauer Law, PLLC

(57) ABSTRACT

An image of an optical tag may be acquired by a camera to extract tag data and determine a pose of the camera relative to the optical tag. The optical tag includes gradient features at the corners. These gradient features transition from one color near the corner of the optical tag to a second color distal to the corner of the optical tag. The image, once acquired, is analyzed to determine gradient values, identify the corners of the optical tag, and determine the boundaries of the optical tag. The contents of the optical tag may then be decoded to extract tag data. In addition, pose data may be determined to indicate a distance and an angle of the camera relative to the optical tag.

20 Claims, 47 Drawing Sheets

Lindauer Law, PLLC

Figure 9A:
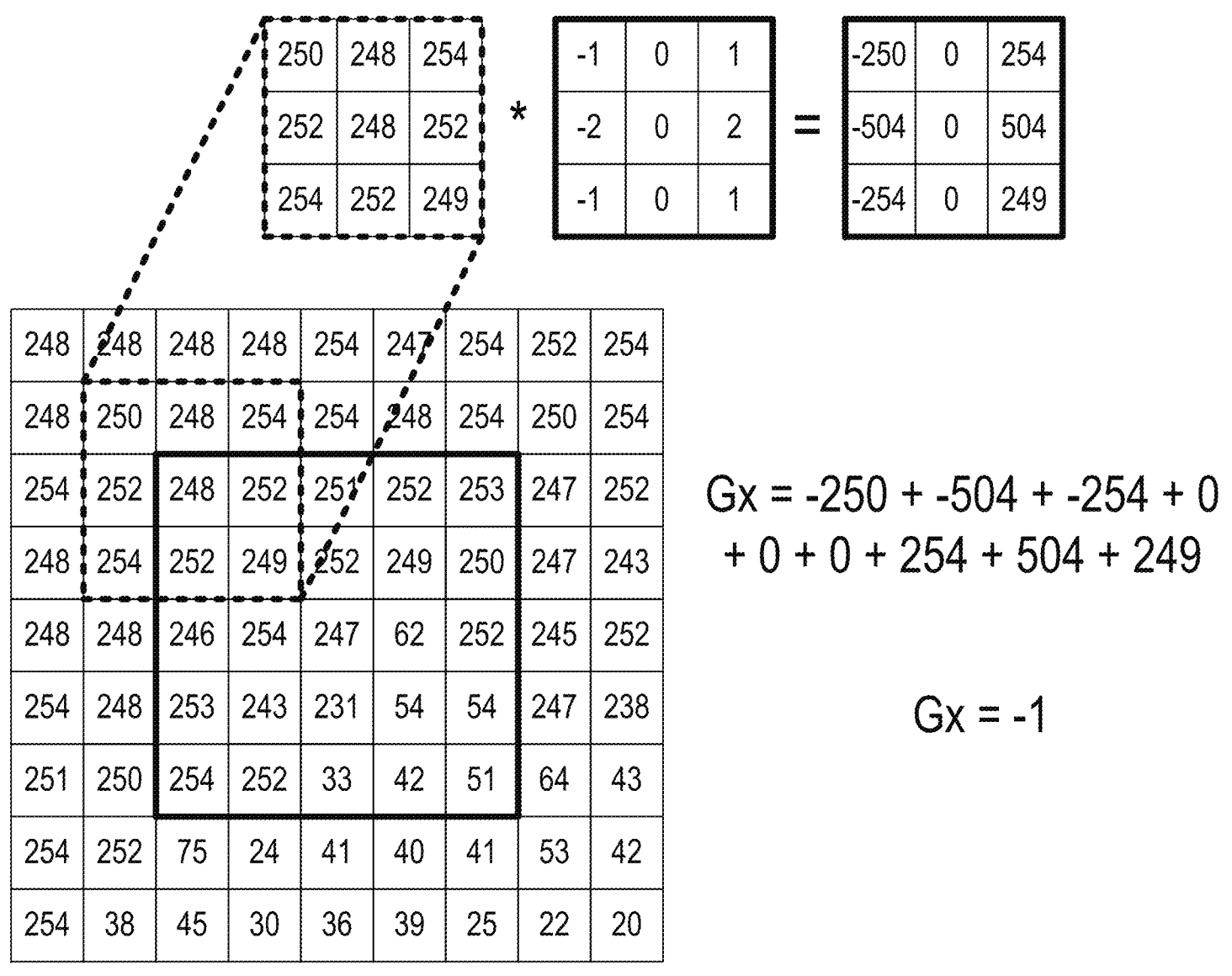

| | | |
|---|---|---|
| 250 | 248 | 254 |
| 252 | 248 | 252 |
| 254 | 252 | 249 |

*

| | | |
|---|---|---|
| -1 | 0 | 1 |
| -2 | 0 | 2 |
| -1 | 0 | 1 |

=

| | | |
|---|---|---|
| -250 | 0 | 254 |
| -504 | 0 | 504 |
| -254 | 0 | 249 |

| | | | | | | | | |
|---|---|---|---|---|---|---|---|---|
| 248 | 248 | 248 | 248 | 254 | 247 | 254 | 252 | 254 |
| 248 | 250 | 248 | 254 | 254 | 248 | 254 | 250 | 254 |
| 254 | 252 | 248 | 252 | 251 | 252 | 253 | 247 | 252 |
| 248 | 254 | 252 | 249 | 252 | 249 | 250 | 247 | 243 |
| 248 | 248 | 246 | 254 | 247 | 62 | 252 | 245 | 252 |
| 254 | 248 | 253 | 243 | 231 | 54 | 54 | 247 | 238 |
| 251 | 250 | 254 | 252 | 33 | 42 | 51 | 64 | 43 |
| 254 | 252 | 75 | 24 | 41 | 40 | 41 | 53 | 42 |
| 254 | 38 | 45 | 30 | 36 | 39 | 25 | 22 | 20 |

| | | | | | | | | |
|---|---|---|---|---|---|---|---|---|
| | | | | | | | | |
| | | | | | | | | |
| | | -1 | 12 | -6 | 2 | -10 | | |
| | | -4 | 4 | -192 | 3 | 174 | | |
| | | 2 | -20 | -573 | -169 | 557 | | |
| | | -2 | -264 | -780 | -331 | 591 | | |
| | | -229 | -498 | -593 | -141 | 250 | | |
| | | | | | | | | |
| | | | | | | | | |

Gx Values

| | | |
|---|---|---|
| 250 | 248 | 254 |
| 252 | 248 | 252 |
| 254 | 252 | 249 |

*

| | | |
|---|---|---|
| -1 | -2 | -1 |
| 0 | 0 | 0 |
| 1 | 2 | 1 |

=

| | | |
|---|---|---|
| -250 | -496 | -254 |
| 0 | 0 | 0 |
| 254 | 504 | 249 |

| | | | | | | | | |
|---|---|---|---|---|---|---|---|---|
| 248 | 248 | 248 | 248 | 254 | 247 | 254 | 252 | 254 |
| 248 | 250 | 248 | 254 | 254 | 248 | 254 | 250 | 254 |
| 254 | 252 | 248 | 252 | 251 | 252 | 253 | 247 | 252 |
| 248 | 254 | 252 | 249 | 252 | 249 | 250 | 247 | 243 |
| 248 | 248 | 246 | 254 | 247 | 62 | 252 | 245 | 252 |
| 254 | 248 | 253 | 243 | 231 | 54 | 54 | 247 | 238 |
| 251 | 250 | 254 | 252 | 33 | 42 | 51 | 64 | 43 |
| 254 | 252 | 75 | 24 | 41 | 40 | 41 | 53 | 42 |
| 254 | 38 | 45 | 30 | 36 | 39 | 25 | 22 | 20 |

Lindauer Law, PLLC

| | | | | |
|---|---|---|---|---|
| -1 | 12 | -6 | 2 | -10 |
| -4 | 4 | -192 | 3 | 174 |
| 2 | -20 | -573 | -169 | 557 |
| -2 | -264 | -780 | -331 | 591 |
| -229 | -498 | -593 | -141 | 250 |

Gx Values

| | | | | |
|---|---|---|---|---|
| 7 | -8 | -8 | -4 | -10 |
| -6 | -2 | -196 | -385 | -194 |
| -10 | -32 | -243 | -607 | -587 |
| 16 | -210 | -450 | -455 | -603 |
| -571 | -806 | -613 | -231 | -234 |

Gy Values

FIG. 9E $$E(u, v) = \sum_{x,y} w(x, y)[I(x + u, y + v) - I(x, y)]^2$$

$$E(u, v) \approx [u \quad v]\left(\sum w(x, y)\begin{bmatrix} I_x^2 & I_xI_y \\ I_xI_y & I_y^2 \end{bmatrix}\right)\begin{bmatrix} u \\ v \end{bmatrix}$$

$$E(u, v) \approx [u \quad v]\, M \begin{bmatrix} u \\ v \end{bmatrix}$$

$$M = \sum w(x, y)\begin{bmatrix} I_x^2 & I_xI_y \\ I_xI_y & I_y^2 \end{bmatrix}$$

FIG. 10

| | | |
|---|---|---|
| -1 | 0 | 1 |

| | | | | | | | | |
|---|---|---|---|---|---|---|---|---|
| 248 | 248 | 248 | 248 | 254 | 247 | 254 | 252 | 254 |
| 248 | 250 | 248 | 254 | 254 | 248 | 254 | 250 | 254 |
| 254 | 252 | 248 | 252 | 251 | 252 | 253 | 247 | 252 |
| 248 | 254 | 252 | 249 | 252 | 249 | 250 | 247 | 243 |
| 248 | 248 | 246 | 254 | 247 | 62 | 252 | 245 | 252 |
| 254 | 248 | 253 | 243 | 231 | 54 | 54 | 247 | 238 |
| 251 | 250 | 254 | 252 | 33 | 42 | 51 | 64 | 43 |
| 254 | 252 | 75 | 24 | 41 | 40 | 41 | 53 | 42 |
| 254 | 38 | 45 | 30 | 36 | 39 | 25 | 22 | 20 |

FIG. 13

$I_x = -252 + 0 + 252 = 0$ $$\begin{array}{|c|c|c|} \hline -1 & 0 & 1 \\ \hline \end{array} * \begin{array}{|c|c|c|} \hline 252 & 248 & 252 \\ \hline \end{array} = \begin{array}{|c|c|c|} \hline -252 & 0 & 252 \\ \hline \end{array}$$

| 254 | 254 | 252 | 243 | 252 | 238 | 43 | 42 | 20 |
|---|---|---|---|---|---|---|---|---|
| 252 | 250 | 247 | 247 | 245 | 247 | 64 | 53 | 22 |
| 254 | 254 | 253 | 250 | 252 | 54 | 51 | 41 | 25 |
| 247 | 248 | 252 | 249 | 62 | 54 | 42 | 40 | 39 |
| 254 | 254 | 251 | 252 | 247 | 231 | 33 | 41 | 36 |
| 248 | 254 | 252 | 249 | 254 | 243 | 252 | 24 | 30 |
| 248 | 248 | 248 | 252 | 246 | 253 | 254 | 75 | 45 |
| 248 | 250 | 252 | 254 | 248 | 248 | 250 | 252 | 38 |
| 248 | 248 | 254 | 248 | 248 | 254 | 251 | 254 | 254 |

Ix(3,3) = 0

$$\begin{array}{|c|c|c|}\hline -1 & 0 & 1 \\\hline\end{array} \quad * \quad \begin{array}{|c|c|c|}\hline 248 & 248 & 252 \\\hline\end{array} \quad = \quad \begin{array}{|c|c|c|}\hline -248 & 0 & 252 \\\hline\end{array}$$

Ix Values

| | | | | | | |
|---|---|---|---|---|---|---|
| 0 | 4 | 6 | -6 | 0 | 2 | 0 |
| -6 | 0 | 3 | 0 | 2 | -5 | -1 |
| 4 | -5 | 0 | 0 | -2 | -2 | -7 |
| -2 | 6 | 1 | -192 | 5 | 183 | 0 |
| -1 | -5 | -22 | -189 | -177 | 193 | 184 |
| 3 | 2 | -221 | -210 | 18 | 22 | -8 |
| -179 | -228 | -34 | 16 | 0 | 13 | 1 |

Iy Values

| | | | | | | |
|---|---|---|---|---|---|---|
| 4 | 0 | 4 | -3 | 5 | -1 | -5 |
| 4 | 4 | -5 | -2 | 1 | -4 | -3 |
| -4 | -2 | 2 | -4 | -190 | -1 | -2 |
| -6 | 1 | -6 | -21 | -195 | -196 | 0 |
| 2 | 8 | -2 | -214 | -20 | -201 | -181 |
| 4 | -178 | -219 | -190 | -14 | -13 | -194 |
| -212 | -209 | -222 | 3 | -3 | -26 | -42 |

FIG. 17

| | | | | | | | | |
|---|---|---|---|---|---|---|---|---|
| 0.9725 | 0.9725 | 0.9725 | 0.97254902 | 0.9961 | 0.9686 | 0.9961 | 0.9882 | 0.9961 |
| 0.9725 | 0.9804 | 0.9725 | 0.996078431 | 0.9961 | 0.9725 | 0.9961 | 0.9804 | 0.9961 |
| 0.9961 | 0.9882 | 0.9725 | 0.988235294 | 0.9843 | 0.9882 | 0.9922 | 0.9686 | 0.9882 |
| 0.9725 | 0.9961 | 0.9882 | 0.976470588 | 0.9882 | 0.9765 | 0.9804 | 0.9686 | 0.9529 |
| 0.9725 | 0.9725 | 0.9647 | 0.996078431 | 0.9686 | 0.2431 | 0.9882 | 0.9608 | 0.9882 |
| 0.9961 | 0.9725 | 0.9922 | 0.952941176 | 0.9059 | 0.2118 | 0.2118 | 0.9686 | 0.9333 |
| 0.9843 | 0.9804 | 0.9961 | 0.988235294 | 0.1294 | 0.1647 | 0.2 | 0.251 | 0.1686 |
| 0.9961 | 0.9882 | 0.2941 | 0.094117647 | 0.1608 | 0.1569 | 0.1608 | 0.2078 | 0.1647 |
| 0.9961 | 0.149 | 0.1765 | 0.117647059 | 0.1412 | 0.1529 | 0.098 | 0.0863 | 0.0784 |

Scaled Grayscale Values

FIG. 18

Ix Values

| | | | | | | |
|---|---|---|---|---|---|---|
| 0 | 0.0157 | 0.023529412 | -0.0235 | 0 | 0.0078 | 0 |
| -0.0235 | 0 | 0.011764706 | 0 | 0.0078 | -0.0196 | -0.0039 |
| 0.0157 | -0.0196 | 0 | 0 | -0.0078 | -0.0078 | -0.0275 |
| -0.0078 | 0.0235 | 0.003921569 | -0.7529 | 0.0196 | 0.7176 | 0 |
| -0.0039 | -0.0196 | -0.08627451 | -0.7412 | -0.6941 | 0.7569 | 0.7216 |
| 0.0118 | 0.0078 | -0.86666667 | -0.8235 | 0.0706 | 0.0863 | -0.0314 |
| -0.702 | -0.8941 | -0.13333333 | 0.0627 | 0 | 0.051 | 0.0039 |

Iy Values

| | | | | | | |
|---|---|---|---|---|---|---|
| 0.01569 | 0 | 0.0157 | -0.0118 | 0.0196 | -0.0039 | -0.0196 |
| 0.01569 | 0.0157 | -0.0196 | -0.0078 | 0.0039 | -0.0157 | -0.0118 |
| -0.0157 | -0.0078 | 0.0078 | -0.0157 | -0.7451 | -0.0039 | -0.0078 |
| -0.0235 | 0.0039 | -0.0235 | -0.0824 | -0.7647 | -0.7686 | 0 |
| 0.00784 | 0.0314 | -0.0078 | -0.8392 | -0.0784 | -0.7882 | -0.7098 |
| 0.01569 | -0.698 | -0.8588 | -0.7451 | -0.0549 | -0.051 | -0.7608 |
| -0.8314 | -0.8196 | -0.8706 | 0.0118 | -0.0118 | -0.102 | -0.1647 |

FIG. 19

$Ix^2$ Values

| | | | | | | |
|---|---|---|---|---|---|---|
| 0 | 0.0002 | 0.000553633 | 0.0006 | 0 | 6E-05 | 0 |
| 0.0006 | 0 | 0.000138408 | 0 | 6E-05 | 0.0004 | 2E-05 |
| 0.0002 | 0.0004 | 0 | 0 | 6E-05 | 6E-05 | 0.0008 |
| 6E-05 | 0.0006 | 1.53787E-05 | 0.5669 | 0.0004 | 0.515 | 0 |
| 2E-05 | 0.0004 | 0.007443291 | 0.5493 | 0.4818 | 0.5728 | 0.5207 |
| 0.0001 | 6E-05 | 0.751111111 | 0.6782 | 0.005 | 0.0074 | 0.001 |
| 0.4927 | 0.7994 | 0.017777778 | 0.0039 | 0 | 0.0026 | 2E-05 |

$Iy^2$ Values

| | | | | | | |
|---|---|---|---|---|---|---|
| 0.00025 | 0 | 0.0002 | 0.0001 | 0.0004 | 2E-05 | 0.0004 |
| 0.00025 | 0.0002 | 0.0004 | 6E-05 | 2E-05 | 0.0002 | 0.0001 |
| 0.00025 | 6E-05 | 6E-05 | 0.0002 | 0.5552 | 2E-05 | 6E-05 |
| 0.00055 | 2E-05 | 0.0006 | 0.0068 | 0.5848 | 0.5908 | 0 |
| 6.2E-05 | 0.001 | 6E-05 | 0.7043 | 0.0062 | 0.6213 | 0.5038 |
| 0.00025 | 0.4873 | 0.7376 | 0.5552 | 0.003 | 0.0026 | 0.5788 |
| 0.69118 | 0.6718 | 0.7579 | 0.0001 | 0.0001 | 0.0104 | 0.0271 |

IxIy Values

| | | | | | | |
|---|---|---|---|---|---|---|
| 0 | 0 | 0.0004 | 0.0003 | 0 | -3E-05 | 0 |
| -0.0004 | 0 | -0.0002 | 0 | 3E-05 | 0.0003 | 5E-05 |
| -0.0002 | 0.0002 | 0 | 0 | 0.0058 | 3E-05 | 0.0002 |
| 0.0002 | 9E-05 | -9E-05 | 0.062 | -0.015 | -0.5516 | 0 |
| -3E-05 | -0.0006 | 0.0007 | 0.622 | 0.0544 | -0.5966 | -0.5122 |
| 0.0002 | -0.0055 | 0.7443 | 0.6136 | -0.0039 | -0.0044 | 0.0239 |
| 0.5836 | 0.7328 | 0.1161 | 0.0007 | 0 | -0.0052 | -0.0006 |

FIG. 20

$Ix^2$ Values

| | | | | | | |
|---|---|---|---|---|---|---|
| 0 | 0.0002 | 0.000553633 | 0.0006 | 0 | 6E-05 | 0 |
| 0.0006 | 0 | 0.000138408 | 0 | 6E-05 | 0.0004 | 2E-05 |
| 0.0002 | 0.0004 | 0 | 0 | 6E-05 | 6E-05 | 0.0008 |
| 6E-05 | 0.0006 | 1.53787E-05 | 0.5669 | 0.0004 | 0.515 | 0 |
| 2E-05 | 0.0004 | 0.007443291 | 0.5493 | 0.4818 | 0.5728 | 0.5207 |
| 0.0001 | 6E-05 | 0.751111111 | 0.6782 | 0.005 | 0.0074 | 0.001 |
| 0.4927 | 0.7994 | 0.017777778 | 0.0039 | 0 | 0.0026 | 2E-05 |

Summed $Ix^2$ Values for a 3x3 window around each pixel

| | | | | |
|---|---|---|---|---|
| 0.0021 | 0.001876201 | 0.0014 | 0.0012 | 0.0014 |
| 0.002 | 0.568012303 | 0.5676 | 1.0829 | 0.5167 |
| 0.0091 | 1.125044214 | 1.606 | 2.6864 | 2.0916 |
| 0.7598 | 2.554033064 | 3.0402 | 3.3769 | 2.1041 |
| 2.0691 | 2.807704729 | 2.4946 | 2.3011 | 1.5913 |

FIG. 21

Summed $Ix^2$ Values for a 3x3 window around each pixel

| | | | | |
|---|---|---|---|---|
| 0.0021 | 0.001876201 | 0.0014 | 0.0012 | 0.0014 |
| 0.002 | 0.568012303 | 0.5676 | 1.0829 | 0.5167 |
| 0.0091 | 1.125044214 | 1.606 | 2.6864 | 2.0916 |
| 0.7598 | 2.554033064 | 3.0402 | 3.3769 | 2.1041 |
| 2.0691 | 2.807704729 | 2.4946 | 2.3011 | 1.5913 |

Summed $Iy^2$ Values for a 3x3 window around each pixel

| | | | | |
|---|---|---|---|---|
| 0.0017 | 0.0014 | 0.5567 | 0.5563 | 0.5564 |
| 0.0024 | 0.0084 | 1.1481 | 1.7381 | 1.7312 |
| 0.0026 | 0.713 | 1.8581 | 3.0695 | 2.8621 |
| 1.2273 | 2.4927 | 2.5984 | 3.0749 | 2.8913 |
| 3.3471 | 3.9152 | 2.7645 | 1.9032 | 1.7534 |

Summed IxIy Values for a 3x3 window around each pixel

| | | | | |
|---|---|---|---|---|
| -0.0003 | 0.0006 | 0.0063 | 0.0065 | 0.0064 |
| -0.0005 | 0.0619 | 0.0526 | -0.4984 | -0.5601 |
| 0.0001 | 0.6842 | 0.7299 | -0.4189 | -1.6148 |
| 0.7392 | 2.0365 | 2.0781 | 0.1806 | -1.6053 |
| 2.1715 | 2.8242 | 2.148 | 0.6807 | -1.0446 |

FIG. 22

Determinant values for each pixel in a 5x5 window

| | | | | |
|---|---|---|---|---|
| 4E-06 | 2.38846E-06 | 0.0007 | 0.0006 | 0.0007 |
| 4E-06 | 0.000942876 | 0.6488 | 1.6338 | 0.5808 |
| 2E-05 | 0.334041938 | 2.4513 | 8.0706 | 3.3786 |
| 0.386 | 2.218974422 | 3.5811 | 10.351 | 3.5065 |
| 2.2098 | 3.016721842 | 2.2823 | 3.9162 | 1.699 |

Trace values for each pixel in a 5x5 window

| | | | | |
|---|---|---|---|---|
| 6E-07 | 4.41374E-07 | 0.0125 | 0.0124 | 0.0124 |
| 7E-07 | 0.013290606 | 0.1177 | 0.3183 | 0.2021 |
| 5E-06 | 0.135143441 | 0.48 | 1.3252 | 0.9816 |
| 0.1579 | 1.018775509 | 1.2717 | 1.665 | 0.9981 |
| 1.1734 | 1.807874099 | 1.1063 | 0.7071 | 0.4475 |

FIG. 23

$$R = det(M) - k(trace(M))^2$$

| | | | | |
|---|---|---|---|---|
| 3E-06 | 1.94708E-06 | -0.0117 | -0.0118 | -0.0117 |
| 4E-06 | -0.01234773 | 0.5311 | 1.3155 | 0.3787 |
| 2E-05 | 0.198898497 | 1.9713 | 6.7454 | 2.3971 |
| 0.2281 | 1.200198913 | 2.3094 | 8.686 | 2.5083 |
| 1.0364 | 1.208847743 | 1.176 | 3.2091 | 1.2516 |

| | | | | |
|---|---|---|---|---|
| 2.5802 | 7.1982 | 10.834 | 5.9387 | 1.7499 |
| 1.7905 | 6.9297 | 12.508 | 9.3349 | 2.9388 |
| 0.6439 | 8.1207 | 12.451 | 13.405 | 1.6884 |
| 0.5708 | 5.9475 | 7.639 | 10.207 | 2.5083 |
| 1.0364 | 1.2088 | 1.176 | 3.2091 | 1.2516 |

FIG. 28

SYSTEM FOR DETECTING CORNERS OF AN OPTICAL TAG

PRIORITY

This application is a divisional of, and claims priority to, U.S. patent application Ser. No. 17/936,839, filed on Sep. 29, 2022, entitled "SYSTEM TO GENERATE HIGH PRECISION OPTICAL TAG WITH GRADIENT FEATURES AT THE CORNERS", which is hereby incorporated by reference in its entirety.

BACKGROUND

Optical tags are used in a variety of different use cases.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

FIGS. 9A-9E and 10-43 depict edge detection involving a high precision optical tag, according to one or more implementations.

Figure 1:
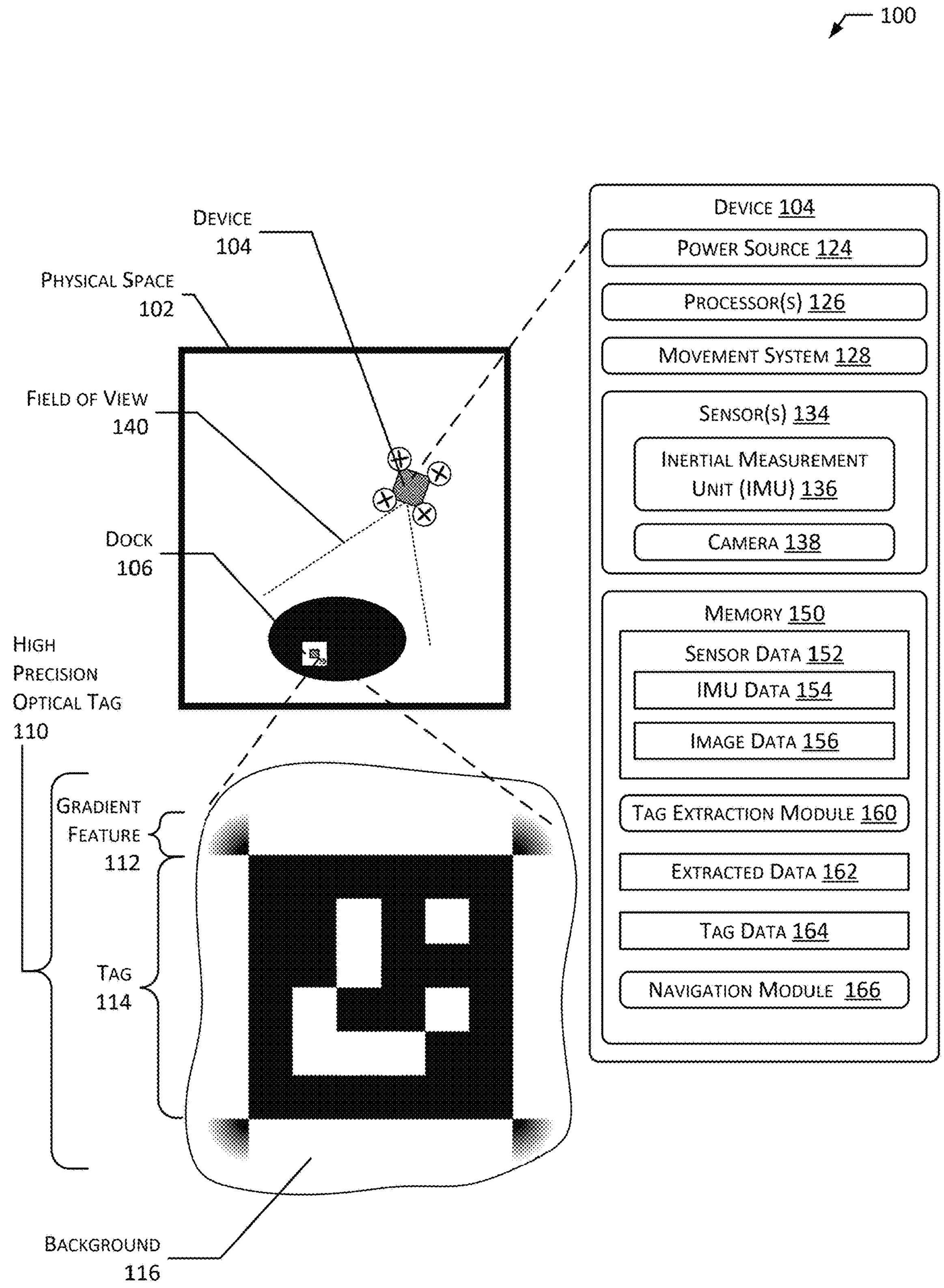
FIG. 1 illustrates a system using a high precision optical tag, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean "including, but not limited to".

DETAILED DESCRIPTION

An optical tag comprises elements arranged in a particular way. For example, an optical tag may comprise a two-dimensional barcode of black and white squares. Optical tags may be used in a variety of ways, including encoding machine-readable data, serving as a fiducial in a physical space, and so forth. In one use case, an optical tag serves as a fiducial or marker in a physical space. A device acquires an image of the optical tag. The image is processed to detect the optical tag depicted in the image. Based on known characteristics of the optical tag, camera, and so forth, a pose in the physical space of the device relative to the optical tag may be determined. The pose may, relative to the optical tag, be indicative of a set of coordinates with respect to one or more axes and a set of rotations with respect to those axes. For example, the device may comprise an aerial drone that uses an optical tag affixed to a dock in the physical space to determine where the aerial drone is, relative to the dock.

Traditional systems used to detect conventional optical tags introduce substantial imprecision. For example, an optical tag processing algorithm may be used to process image data and determine a boundary of the optical tag depicted therein. Based on the coordinates of that boundary with respect to the image, the pose may be determined. However, the boundary detected for a conventional tag may differ from the actual boundary. For example, a bounding box generated by the optical tag detection algorithm may produce a bounding box that is misaligned relative to the actual boundary in the image data.

As a result of this misaligned boundary, data based on this misaligned boundary may be incorrect. For example, a pose based on that misaligned boundary is incorrect. Continuing the example, a misalignment of the boundary by five pixels may result in a pose estimation that is incorrect by up to 20 centimeters. Continuing this example, an error of 20 centimeters could result in an operational failure, such as the aerial drone being unable to successfully land on the dock.

Described in this disclosure are systems and techniques to generate a high precision optical tag (HPOT) that facilitates precise determination of a boundary of the tag. The HPOT comprises one or more gradient features and a tag. Each of the gradient features comprises an optical gradient pattern, such as shading from black to white. A proximate portion of each gradient feature that is adjacent to a corner of the tag is black. A distal portion of each gradient feature that is distal to the corner of the tag is white. In an implementation using a one-bit color depth in which black is 0 and white is 1, the average color value of gradient elements in the gradient feature may be 0.5. The gradient pattern may be linear or non-linear. The gradient pattern of the gradient feature may be symmetrical with respect to a radial line that extends from the proximal portion away from the tag. In one implementation, each gradient feature may comprise a quarter circle, such as a circular sector with an angle of 90 degrees. Each of the gradient features may be arranged with its proximate portion closest to one of the corners of the tag. The "soft edge" produced by the gradient elements at the corners of the tag or other points of interest results in a substantial advantage as described next.

The HPOT may be used with existing optical tag processing algorithms, providing a substantial improvement in the accuracy of the boundary determined. Compared to the earlier example of a five-pixel misalignment, by using the HPOT instead of the conventional tag while continuing to use the same optical tag processing algorithm, the boundary may be determined to within a single pixel in the image data. This highly accurate determination may be performed for individual frames of image data.

The HPOT is well suited for use in resource-constrained devices, as relatively simple and computationally inexpensive tag detection and processing algorithms exhibit a substantial improvement in the accuracy of boundary determination while processing images of the HPOT compared to traditional optical tags.

By using these systems and techniques, a substantial improvement in the accuracy of boundaries or other portions of a tag is realized. As a result, devices using this information see a substantial improvement during their operation.

Illustrative System

FIG. 1 illustrates a system 100 using a high precision optical tag, according to some implementations. A physical space 102 that includes a device 104 is shown. The physical space 102 may comprise a residence, office, warehouse, and so forth. The device 104 may be an autonomous device. For example, the device 104 may comprise an aerial drone.

The device 104 may be configured to use a dock 106. The dock 106 may provide external power which the device 104 may use to charge a power source 124 such as a battery or capacitor of the device 104.

The system 100 includes a high precision optical tag (HPOT) 110. The HPOT 110, or marker, may comprise a tag 114 and a plurality of gradient features 112. The tag 114 may comprise a two-dimensional barcode comprising a plurality of tag elements. For example, the tag 114 may comprise a two-dimensional array of tag elements. The tag elements may have color values associated with a set of color values. For example, the set of color values may be white and black, and the individual tag elements may be white or black. The tag 114 may be a fiducial or known pattern and size that may be detected by a camera and used by the device 104 to determine pose information. For example, the tag 114 may comprise an ArUco tag, AprilTag, ARTag, ARToolKit tag, and so forth. In other implementations, the tag 114 may comprise a two-dimensional barcode such as an AR Code, Aztec Code, Data Matrix, Dot Code, Han Xin Barcode, QR code, and so forth. While the examples given use black and white tag elements, in other implementations other colors may be used. In one implementation the dock 106 may include one or more HPOTs 110. For example, the device 104 may use the HPOTs 110 to navigate to and connect with the dock 106. In other implementations the HPOTs 110 may be placed within the physical space 102. For example, the physical space 102 may include one or more HPOTs 110 that have been outputted by an output device such as printed by a printer, presented on a display device, and so forth.

The HPOT 110 may be printed on or presented with a background 116. The background 116 may have a color value from the set of color values. Continuing the earlier example, the background 116 may be white.

By combining the gradient features 112 with the tag 114, the corners of the tag 114 are able to quickly and accurately be determined with a substantial increase in the accuracy in the determination of the boundary of the tag 114. Existing techniques, such as the tag detection algorithms of OpenCV, may be used without modification and benefit from the presence of the gradient features 112. The presence of the gradient features 112 in the HPOT 110 and in the resulting image data 156 provide a "soft edge" that improves the performance of a wide variety of existing edge detection algorithms.

For example, many conventional corner detection algorithms, such as those used in OpenCV, perform edge detection based on determining a magnitude of a gradient at every pixel (not to be confused with use of a gradient pattern as described herein), and then identifying edges and corners based on the determined gradient magnitudes. A gradient pattern such as that used in a gradient feature 112 results in a large gradient magnitude between edges of the gradient feature 112 at the proximal portion 222 and the surrounding background, a fading gradient magnitude between edges of the gradient feature 112 and the surrounding background based on moving outwards away from the proximal portion 222, and a small gradient magnitude between edges of the gradient feature 112 and the surrounding background at the distal portion 224. Additionally, a gradient pattern such as that used in a gradient feature 112 results in a small gradient magnitude within the gradient feature 112. Consequently, the corner defined by edges of a tag 114 and edges of the gradient feature 112 is likely to be detected as a corner based on large gradient magnitudes determined for those edges, while other portions of the gradient feature 112 are unlikely to be detected as a corner.

The presence of the gradient features 112 in the HPOT 110 and in the resulting image data 156 may also be used to improve the performance of machine-learning systems such as trained neural networks used to perform edge detection, determine the location of the corners of a tag 114 within the image data 156, and so forth. For example, a neural network trained to determine edges in an image may exhibit improved performance in processing images that include the HPOT 110. This improvement may be realized in situations in which the training data used to train the neural network includes HPOTs 110 or omits HPOTs 110 and only includes samples of tags 114 without the gradient features 112.

The HPOTs 110 are discussed in more detail with regard to FIGS. 2-8.

The device 104 may include a power source 124 to provide electrical power suitable for operating the components in the device 104. For example, the power source 124 may comprise a battery, wireless power transfer device, capacitor, fuel cell, photovoltaic device, and so forth.

The device 104 includes one or more hardware processors 126 (processors) configured to execute one or more stored instructions. The processors 126 may comprise one or more cores. The processors 126 may include microcontrollers, systems on a chip, field programmable gate arrays, digital signal processors, graphic processing units, general processing units, and so forth.

In the implementation depicted, the device 104 includes a movement system 128. For example, the movement system 128 may comprise one or more propellers driven by motors to enable the device 104 to fly from one location to another in the physical space 102. In other examples, the movement system 128 may include wheels driven by motors, legs, and so forth. In other implementations, the device 104 may be manually moved, stationary, and so forth.

The device 104 includes one or more sensors 134 that may be used to generate sensor data 152. The sensors 134 may comprise an inertial measurement unit (IMU) 136, a camera 138, or other sensors.

The IMU 136 may comprise one or more accelerometers and gyrometers, and so forth. During operation, the IMU 136 generates sensor data 152 indicative of one or more of accelerations, rotations, and so forth with respect to one or more axes.

The camera 138 generates image data 156 indicative of one or more images. The camera 138 may be configured to detect light in one or more wavelengths including, but not limited to, terahertz, infrared, visible, ultraviolet, and so forth. For example, an infrared camera 138 may be sensitive to wavelengths between approximately 700 nanometers and 1 millimeter. The camera 138 may comprise charge coupled devices (CCD), complementary metal oxide semiconductor (CMOS) devices, microbolometers, and so forth. The device 104 may use the image data 156 acquired by the camera 138 for tag detection, navigation, object recognition, collision avoidance, user communication, and so forth. For example, a camera 138 sensitive to visible light may be mounted on the front of the device 104 to acquire image data 156.

The device 104 includes one or more memories 150. These may store sensor data 152 acquired by one or more of the sensors 134, such as IMU data 154 and image data 156. For example, the IMU 136 may provide as output IMU data 154 indicative of accelerations and rotations. In another example, the camera 138 may provide image data 156 comprising images depicting the physical space 102.

A tag extraction module 160 may accept as input the image data 156 and determine as output one or more of extracted data 162, tag data 164, and so forth. In one implementation the tag extraction module 160 may process the image data 156 to determine the presence of the tag 114 of the HPOT 110. For example, the tag extraction module 160 may implement the "detectMarkers( )" function available in the aruco module of OpenCV. The detectMarkers( ) function may return as output "markerCorners" data indicative of the location of the tag 114 in the image data 156.

The extracted data 162 may comprise information such as coordinates (with respect to the image data 156) of the corners of the tag 114, a boundary indicative of a perimeter of the tag 114, and so forth. In some implementations the extracted data 162 may comprise pose estimation data, indicative of a pose of the camera 138 relative to the tag 114. The extracted data 162 is discussed in more detail with respect to FIG. 7.

The tag data 164 may comprise information that is encoded in, or represented by, the tag 114. For example, the tag data 164 may comprise a tag identifier value that is indicative of a particular tag 114.

A navigation module 166 provides the device 104 with the ability to navigate within the physical space 102. This may include autonomous navigation in which the device 104 moves without real-time human interaction or may utilize input from an operator. The navigation module 166 may use the extracted data 162, such as pose estimation data, to determine a current pose of the device 104, to determine the location in the physical space 102 of the dock 106, and so forth.

The device 104 may use network interfaces to connect to a network. For example, the network may comprise a wireless local area network, that in turn is connected to a wide area network such as the Internet.

The device 104 may access one or more servers via the network. For example, the device 104 may send image data 156 to an external server for further processing.

Figure 2:
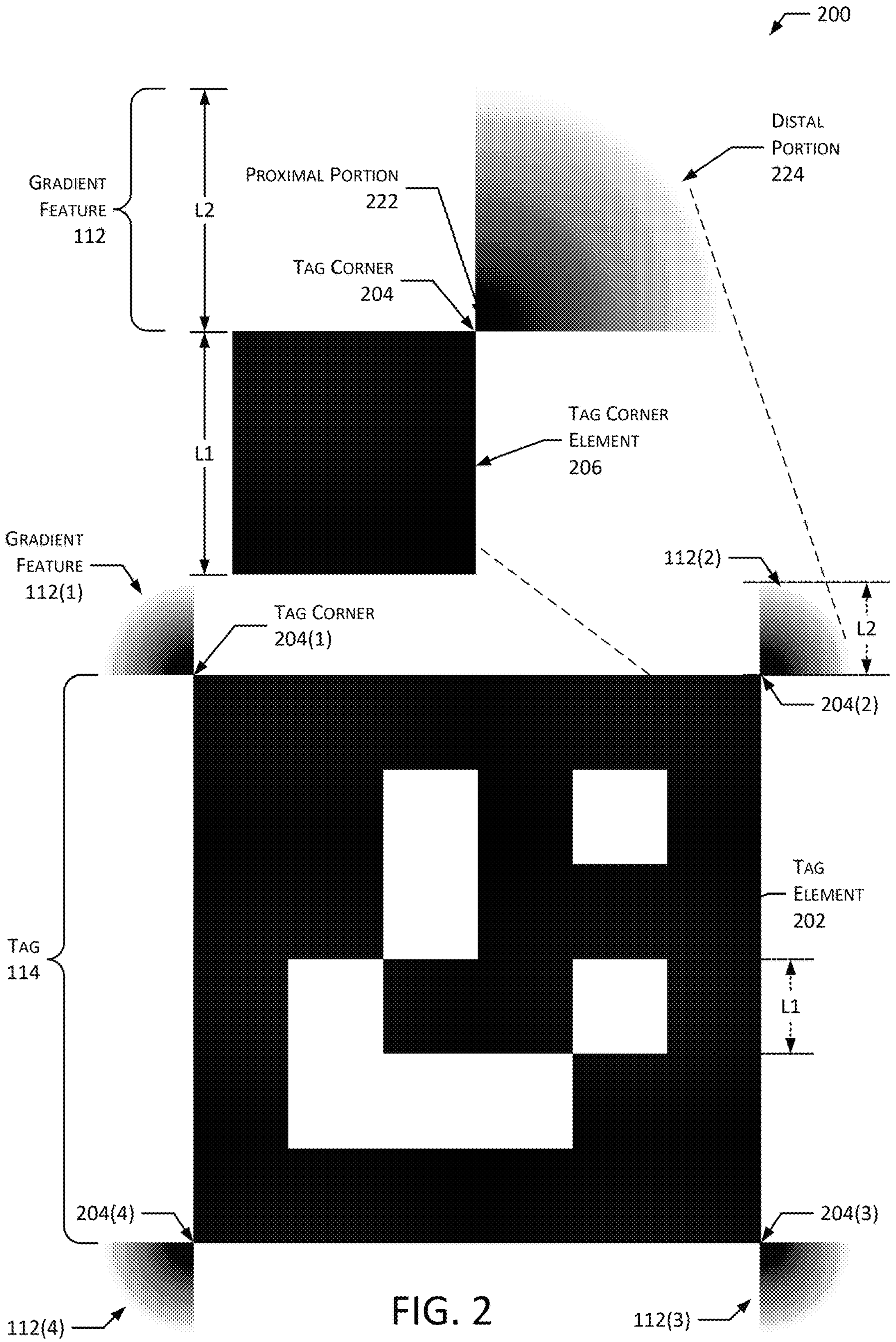
FIG. 2 illustrates a high precision optical tag that comprises a gradient feature, according to one implementation.

FIG. 2 illustrates at 200 a high precision optical tag (HPOT) 110 with an enlarged view of a corner, according to one implementation. The HPOT 110 comprises a tag 114 and one or more gradient features 112.

The tag 114 comprises a plurality of tag elements 202. For example, each tag element 202 may have a shape, such as a square, rectangle, dot, triangle, and so forth. In this illustration, each tag element 202 is a square having a length of L1 of each side. Each tag element 202 may have a color value that is within a specified set of color values. For example, if the set of color values has a bit depth of 1 bit, the set of color values consists of "0" that is represented as a black square and "1" that is represented as a white square. In another example, if the bit depth is 8 bits then the set of color values may consist of decimal values of 0 to 255 in which 0 represents black and 255 represents white. Black and white color values are used in this disclosure by way of illustration, and not necessarily as a limitation. In other implementations other colors may be used. For example, "0" may be represented as yellow while "1" is represented as cyan. In other implementations other bit depths may be used. For example, bit depths of between 1 and 48 bits may be used.

In implementations in which the tag 114 is rectangular or square, the tag 114 has four tag corners 204(1)-(4). Each tag corner 204 of the tag 114 may comprise an outermost portion of a perimeter of a respective tag corner element 206. In this illustration, the tag 114 comprises an Aruco tag with a 4×4 array of tag elements 202, and includes a black border. In other implementations, the tag 114 may have other shapes, such as a triangle with three corners, pentagon with five corners, and so forth. Each tag corner element 206 may have a first color value.

Four gradient features 112(1)-(4) are shown, arranged such that each gradient feature 112 is proximate to each of the tag corners 204. The gradient feature 112 occupies a square having sides of length L2. In one illustration, L2 is equal to L1.

Each gradient feature 112 comprises a color gradient in which one or more of color, intensity, luminance, grayscale, or other value associated with presentation provides a transition from a second color value to a third color value. The gradient may extend from a proximal portion 222 to a distal portion 224 of the gradient feature 112. The proximal portion 222 is proximate to a nearest one of the tag corners 204. The distal portion 224 is distal to the nearest one of the tag corners 204. The second color value may be equal to the first color value in some implementations. The third color value may be equal to the color value of the background 116.

In this illustration, each gradient feature 112 is arranged such that its proximal portion 222 is proximate to a respective one of the tag corners 204. Each gradient feature 112 is a "flap" that extends beyond a perimeter of the tag 114. The gradient feature 112 is described in more detail with regard to FIG. 3.

Figure 3:
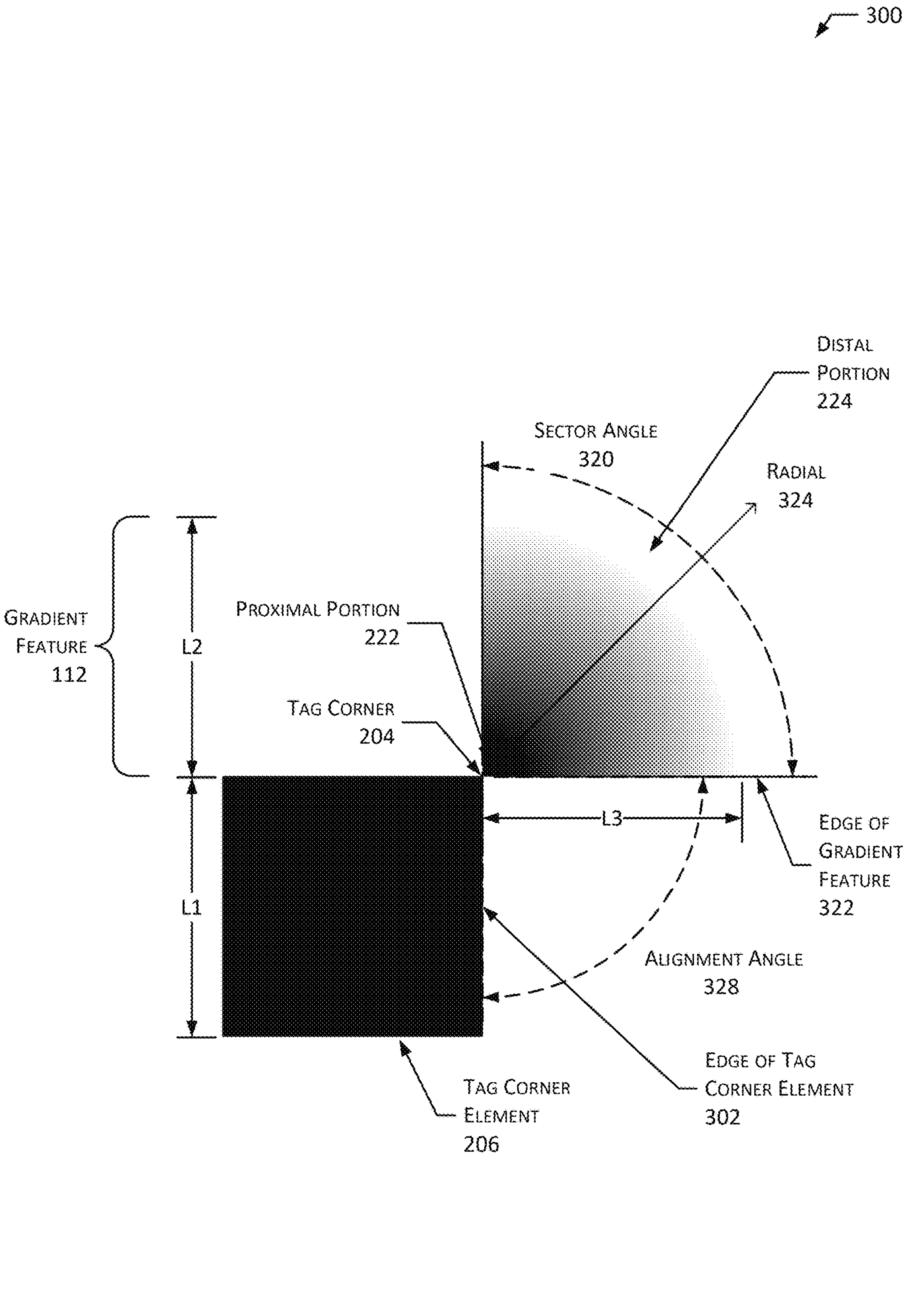
FIG. 3 illustrates various parts of a gradient feature, according to one implementation.

FIG. 3 illustrates at 300 various parts of the gradient feature 112, according to one implementation.

The gradient feature 112 occupies an area associated with a first side having a first length of L2 and a second side having a second length of L3. In this example, L2 is equal to L3, and the gradient feature 112 is within a square.

An edge of a tag corner element 302 is depicted. Also depicted is an edge of a gradient feature 322. An alignment angle 328 extends from the edge of the tag corner element 302 to the edge of the gradient feature 322. In this illustration, the alignment angle 328 is 90 degrees. In other implementations other alignment angles 328 may be used.

The gradient feature 112 may have a sector angle 320 that extends from a first edge of the gradient feature 322 to a second edge of the gradient feature 322. The first edge of the gradient feature 322 and the second edge of the gradient feature 322 may connect at a point that is proximate to, or coincident with, the tag corner 204. In this illustration, the gradient feature 112 describes a quarter circle, or circular sector with the sector angle 320 of 90 degrees. In other implementations other sector angles 320 may be used. For example, the sector angle 320 may be between 20 and 100 degrees. A radial 324 extending from the proximal portion 222 bisects the sector angle 320. In the implementation shown here, the gradient is symmetrical with respect to the radial 324. In other implementations, the gradient may be asymmetrical with respect to the radial 324.

The tag corner element 206 has a first color value, such as black as shown here. The proximal portion 222 of the gradient feature 112 has a second color value. In some implementations, the first color value of the tag corner element 206 may be the same as the second color value of the proximal portion 222 of the gradient feature 112. For example, the first color value of the tag corner element 206 is black and a gradient of the gradient feature 112 may have a second color value indicative of black at the proximal portion 222 and transitions to a third color value indicative of white at the distal portion 224. In some implementations, the third color value may be the same as, or within a threshold difference of, a color value of the background 116.

In some implementations, the first color value of the tag corner element 206 may differ from the second color value of the proximal portion 222. The difference between the second color value and the first color value may be less than a threshold value. In the example in which the set of colors values has 256 possible values, the first color value may have a value of "0" while the second color value may have a value of "10", and the third color value may be "251". A first difference between the third color value and the second color value may be greater than a second difference between the second color value and the first color value. Continuing the example, 251−10=241 which is greater than 10−0=10. Further continuing the example above, the background 116 may have a color value of 255. The third color value may have a value of 251.

In one implementation the gradient may be linear. For example, as a distance from the tag corner 204 along the radial 324 increases, the color value may decrease according to a linear function. Continuing the example, the color value at a given radial distance r may be determined as:

$$\text{Gradient Color Value}=(r/r_{max}) \quad \text{EQUATION 1}$$

where r is a radial distance and $r_{max}$ is a maximum radial distance

In another implementation the gradient may be non-linear. For example, as a distance from the tag corner 204 along the radial 324 increases, the color value may decrease according to a non-linear function. Continuing the example, the color value at a given radial distance r may be determined as:

$$\text{Gradient Color Value}=r^2 \quad \text{EQUATION 2}$$

where r is a radial distance

In implementations in which a 1 bit color depth is used, an average color value for a given gradient feature 112 may be between 0.4 and 0.6. For example, a sum the color values of all gradient elements divided by a total count of the gradient elements may have a value of between 0.4 and 0.6 of a maximum color value of the set of color values.

The gradient may be generated using a variety of different techniques. For example, the gradient feature 112 may be determined using halftoning, dithering, or other techniques. For example, the gradient feature 112 may comprise gradient elements that have color values from the set of color values, but when combined produce a gradient resulting from dithering.

Figure 4:
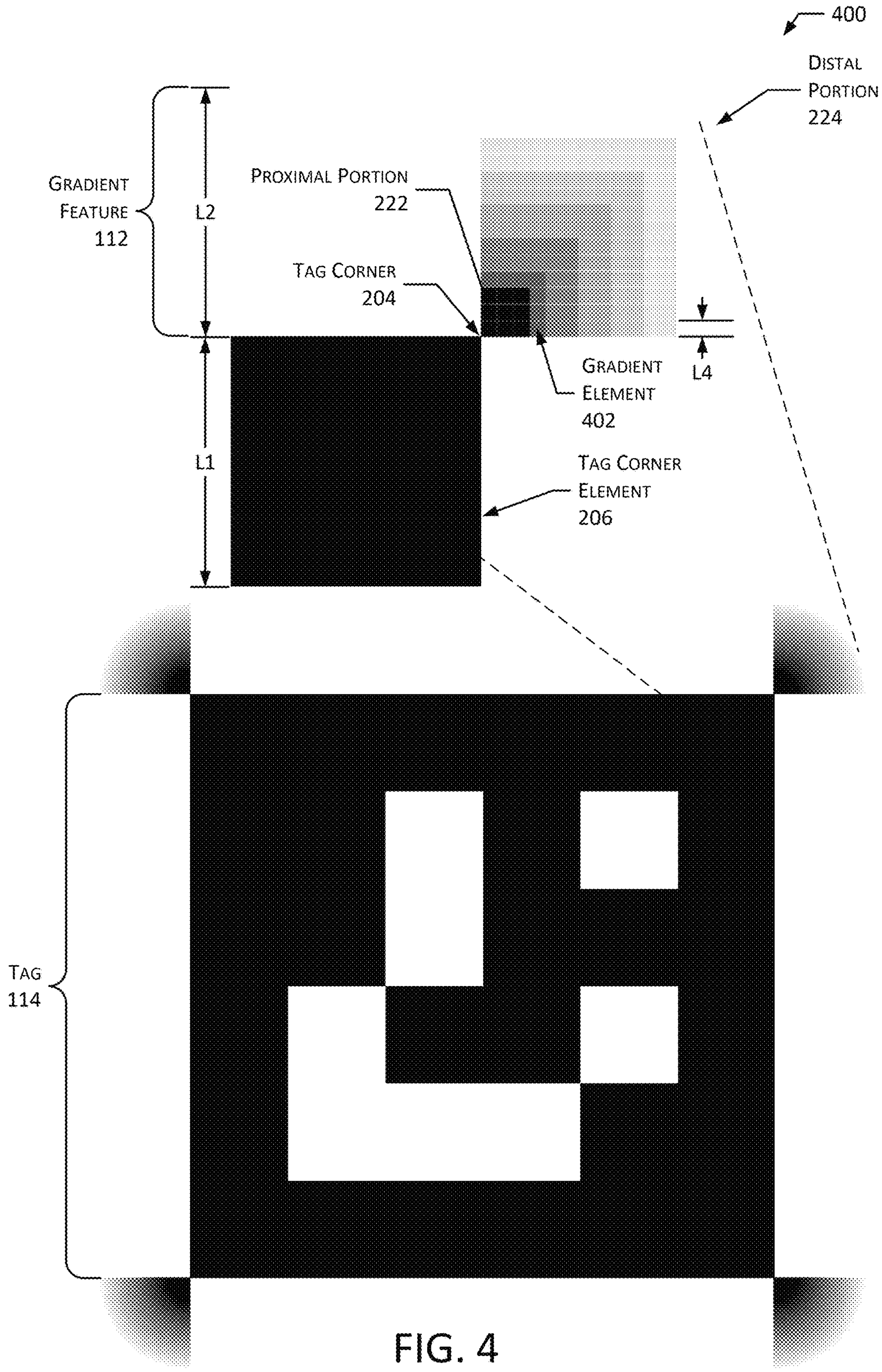
FIG. 4 illustrates a high precision optical tag, according to another implementation.

FIG. 4 illustrates at 400 another implementation of an HPOT 110. In this illustration, the gradient feature 112 comprises a plurality of gradient elements 402. Each gradient element 402 in this illustration is square, having sides of length L4. As shown in this illustration, L4 is less than L2 and L4 is less than L1. For example, the size of each gradient element 402 is less than the size of a tag element 202. While the gradient elements 402 are depicted as squares, in other implementations other shapes may be used. For example, the gradient elements 402 may comprise triangles, rectangles, circles, and so forth.

In one implementation, the size of each gradient element 402 may have a length L4 that is less than 0.09 of L1. For example, each gradient feature 112 may comprise a 10×10 array of gradient elements 402, with each gradient element 402 having a length L4 that is $1/10^{th}$ L1.

In this illustration the gradient elements 402 have various color values that are between the first color value and the third color value. For example, the gradient elements 402 have varying shades of gray. An average color value of each gradient feature 112 may be between 0.4 and 0.6 of a maximum color value of the set of color values. For example, given the set of color values ranges from 0 to 255. The average color value may be calculated as a sum of the color values of all gradient elements 402 in the gradient feature 112 divided by a total count of the gradient elements 402 in the gradient feature 112. The average color value may be between (0.4)*(255)=102 and (0.6)*(255)=153.

Figure 5:
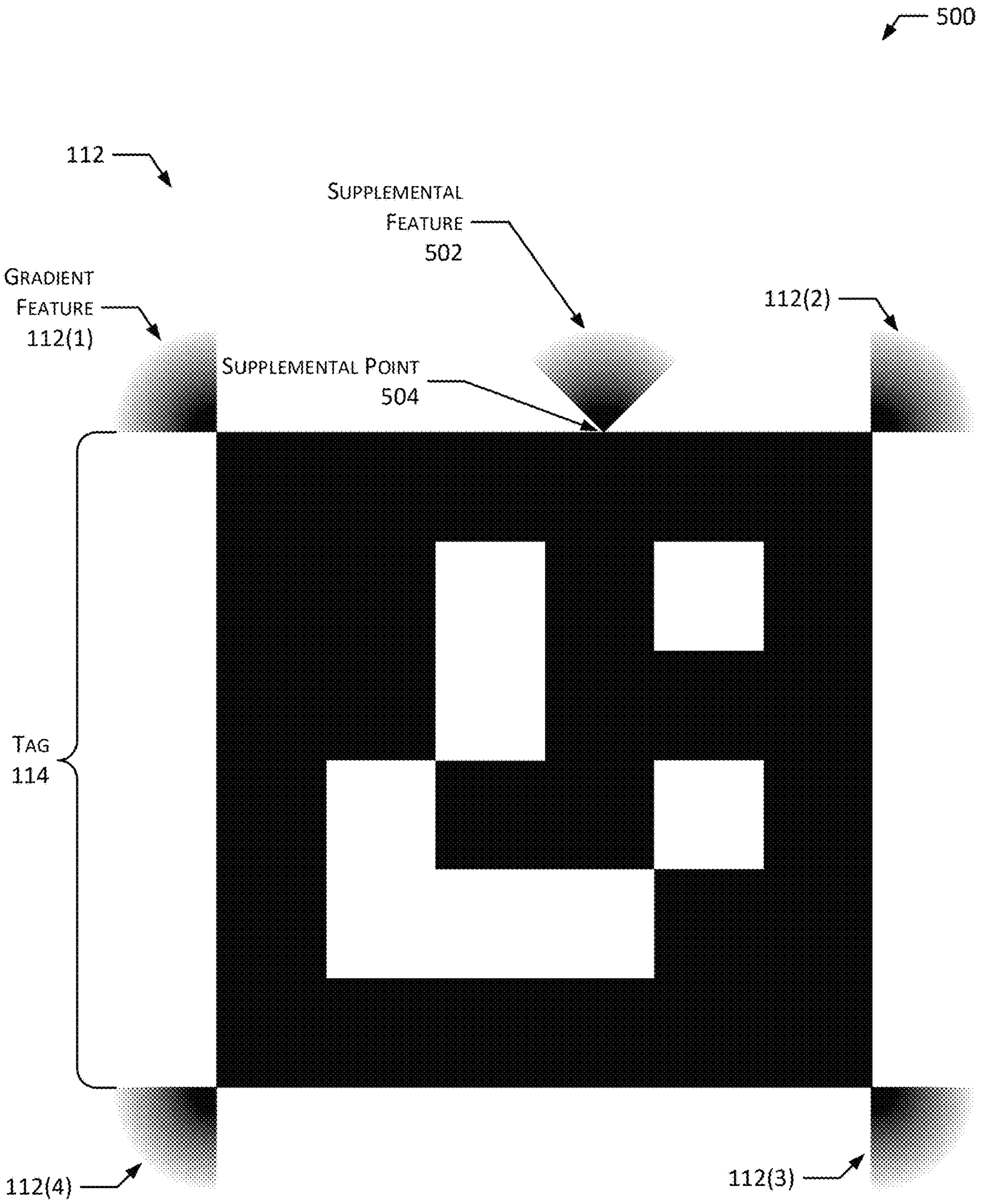
FIG. 5 illustrates a high precision optical tag including a supplemental feature, according to another implementation.

FIG. 5 illustrates at 500 an HPOT 110 including a supplemental feature 502, according to another implementation. In some implementations, it may be advantageous to provide a supplemental point 504 to provide an additional point on the boundary of the tag 114, establish a relative orientation of the HPOT 110 within the image data 156, and so forth.

In this illustration, the supplemental feature 502 is located between gradient features 112(1) and 112(2) and has a supplemental point 504 between tag corner 204(1) and 204(2) (as shown in FIG. 2). The supplemental point 504 is located on a perimeter or border of the tag 114. The supplemental feature 502 is arranged, relative to an edge of a tag element 202 of a border of the tag 114, with an alignment angle of 45 degrees and exhibits a sector angle 320 of 90 degrees.

Figure 6:
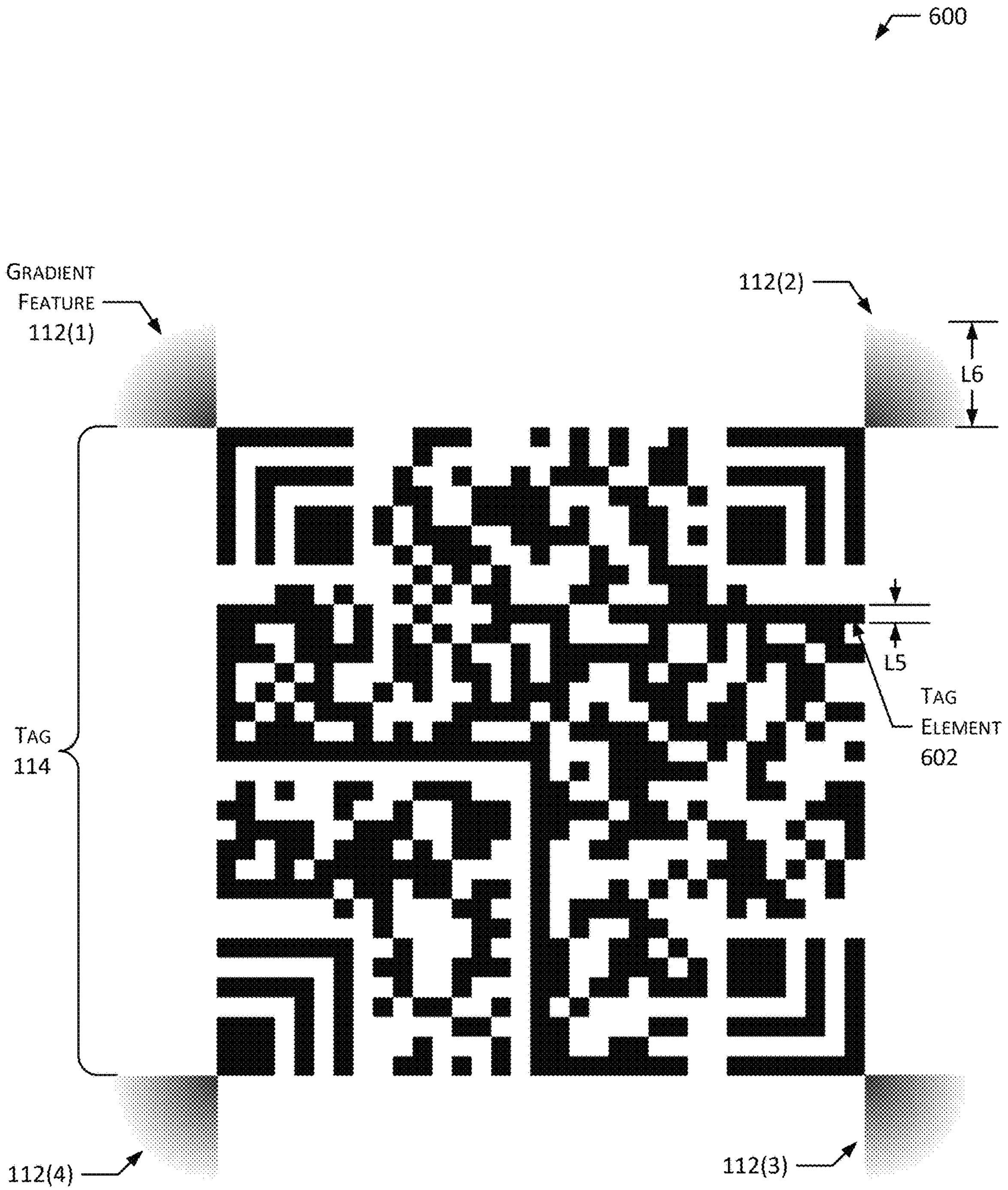
FIG. 6 illustrates a high precision optical tag, according to another implementation.

FIG. 6 illustrates at 600 another implementation of an HPOT 110. In this implementation the tag 114 comprises a Han Xin Barcode with tag elements 602 that are square. Each tag element 602 has a side with a length L5. Also shown are the gradient features 112 arranged at the corners of the tag 114. Each of the gradient features 112 have a respective side having a length L6. In this illustration L6 is greater than L5.

Also shown, there is a nonzero difference between the color values of the tag corners 204 and the proximal portion 222. For example, the tag corner element 206 may have a first color value of 255 while the gradient element 402 proximal to the tag corner 204 has a second color value of 241.

Figure 7:
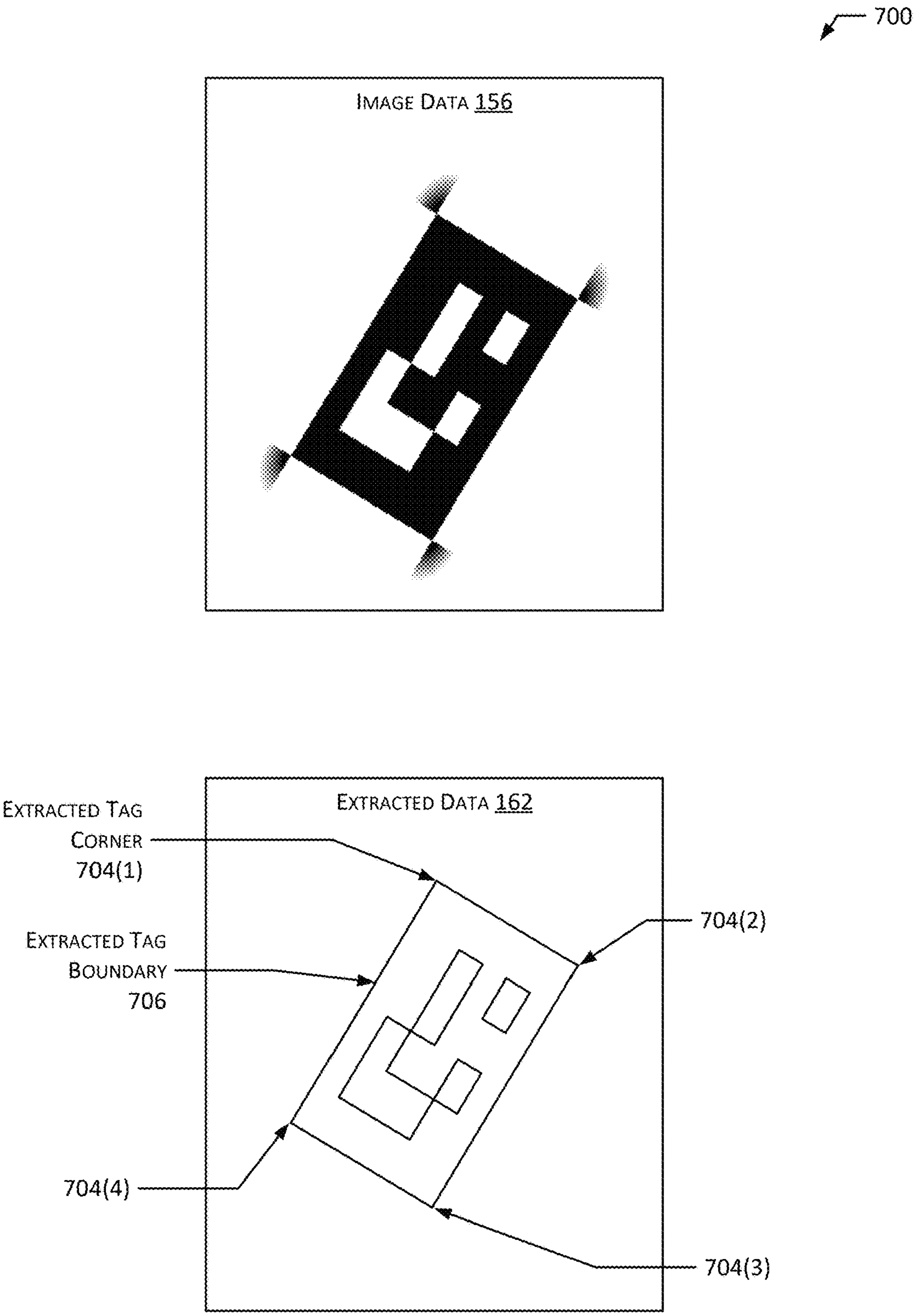
FIG. 7 illustrates image data and extracted data, according to one implementation.

FIG. 7 illustrates at 700 image data 156 and extracted data 162, according to one implementation. In this illustration, the image data 156 depicts the HPOT 110 at a relative pose in which the HPOT 110 appears skewed and rotated relative to the camera 138.

The extracted data 162 depicts the extracted tag corners 704. The extracted tag corners 704 may comprise information indicative of the coordinates, with respect to the image data 156, of a tag corner 204. For example, the extracted tag corner 704(1) corresponds to the tag corner 204(1), extracted tag corner 704(2) corresponds to the tag corner 204(2), extracted tag corner 704(3) corresponds to the tag corner 204(3), and extracted tag corner 704(4) corresponds to the tag corner 204(4).

Also depicted is an extracted tag boundary 706. For example, the extracted tag boundary 706 may comprise a boundary that is indicative of an edge of the tag 114 as depicted in the image data 156. Also shown are other edge features that have been detected, such as the edges of the tag elements 202. In this illustration, the extracted data 162 does not depict the gradient features 112. The relatively "soft edge" prevents the gradient features 112 from being determined to be an "edge" and thus appearing in the extracted data 162. This characteristic, during processing by a wide variety of edge detection algorithms, results in a substantially more accurate determination of the extracted tag corners 704 and extracted tag boundary 706.

In some implementations, the improved accuracy in the determination of one or more of the extracted tag corners 704 or extracted tag boundary 706 may improve other operations such as image rectification, decoding of data encoded in the tag 114, and so forth. For example, given the improved precision of this data, subsequent image rectification of the image of the tag 114 is improved. Continuing the example, the improved image rectification may improve the accuracy of the data decoded from the rectified image data.

Figure 8:
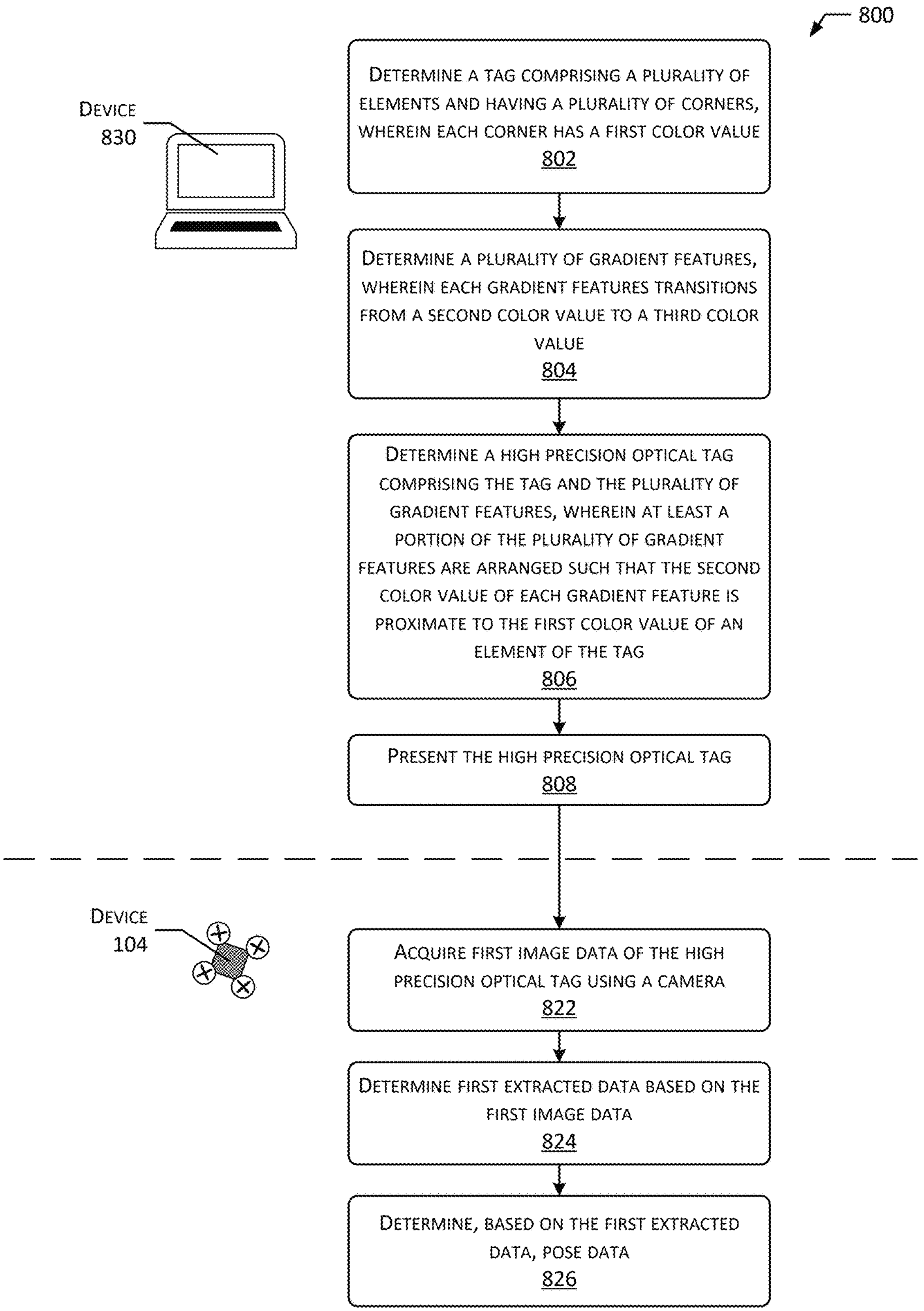
FIG. 8 is a flow diagram of a process to generate and use a high precision optical tag, according to some implementations.

FIG. 8 is a flow diagram 800 of a process to generate and use a high precision optical tag 110, according to some implementations. The process may be implemented by processors of one or more of a device 830, device 104, and so forth.

A device 830 such as a laptop, desktop computer, table, server, and so forth may comprise one or more processors, memories, and so forth as described above. The operations described with respect to blocks 802 through 808 may be performed by one or more devices 830.

At 802 a tag 114 is determined comprising a plurality of tag elements 202. For example, an Aruco tag may be generated. The tag 114 comprises a plurality of corners, each corner having a first color value. For example, the first color value may be "0" corresponding to black. In some implementations, a border may be added to the tag 114, with the border comprising border tag elements that have the first color value.

At 804 a plurality of gradient features 112 are determined. As described above, each gradient feature 112 transitions from a second color value to a third color value. In some implementations the gradient may be the same across all gradient features 112. In other implementations, different gradients may be used for different gradient features 112.

At 806 an HPOT 110 is determined comprising the tag 114 and the plurality of gradient features 112. At least a portion of the plurality of gradient features 112 are arranged such that the second color value of each gradient feature is proximate to the first color value of an element of the tag 114. For example, the proximal portion 222 of the gradient feature 112 is proximate to the tag corner 204.

At 808 the HPOT 110 is presented using an output device. For example, the HPOT 110 may be printed using a printing device such as a laser printer, inkjet printer, and so forth. In another example, the HPOT 110 may be presented using a display device such as a display screen, electronic ink, display projector, and so forth. In one use case, one or more HPOTs 110 may be printed and arranged within a testing facility for use during development of the device 104.

The operations described with respect to blocks 822 through 826 may be performed by the device 104. As described above, the inclusion of the gradient feature 112 in the HPOT 110 allows for highly accurate determination of a boundary of the tag 114. This is computationally efficient, and allows this highly accurate determination to be performed onboard a resource constrained device, such as a low powered aerial drone.

At 822 first image data 156 of an HPOT 110 is acquired. For example, a camera 138 onboard the device 104 may acquire the first image data 156.

At 824 first extracted data 162 is determined based on the first image data 156. For example, the device 104 may determine one or more of the extracted tag corners 704, extracted tag boundary 706, and so forth. Continuing the example, the device 104 may decode the information encoded in the tag 114 to determine a tag identifier.

At 826, based on the first extracted data 162, pose data is determined. For example, the device 104 may use the pose estimation algorithms available within OpenCV to determine a relative distance and angle of the camera 138 relative to the tag 114.

The pose data may then be used by the device 104. For example, if the HPOT 110 is affixed to a dock 106, the navigation module 166 of the device 104 may use the pose data to approach and connect to the dock 106. In another example, the device 104 may use one or more HPOTs 110 within the physical space 102 to determine a current pose of the device 104. In accordance with one or more implementations, a method for analyzing an image comprises determining, based on the image, a plurality of candidate markers. This may involve, for example, identifying three candidate markers, or identifying more than one hundred candidate markers in an image.

In accordance with one or more implementations, this is based on determining a plurality of gradient values for pixels in the image and then determining edges based thereon.

In accordance with one or more implementations, an image is first converted to grayscale, and then an edge detection algorithm is utilized, such as a Canny edge detection algorithm, e.g. the cv.Canny( ) function of OpenCV.

In accordance with one or more implementations, after being converted to grayscale, a threshold is utilized to convert a grayscale image to a binary or two-tone image, e.g. a black and white image having value 0 (e.g. corresponding to black) or 1 (e.g. corresponding to white). In a simplistic approach, for example, considering grayscale pixel values between 0 and 255, any pixel values of 122 or higher might result in a binary pixel value of 1, while any pixel values below 122 might result in a binary pixel value of 0.

In accordance with one or more implementations, a dynamic thresholding algorithm is utilized to utilize a dynamic threshold for a pixel or portion of an image based on attributes of the image or portions of the image (e.g. portions of the image surrounding a particular pixel).

In accordance with one or more implementations, to facilitate edge detection, a Gaussian filter is applied to smooth noise from the image.

In accordance with one or more implementations, for edge detection, a Sobel operator is used for the denoised image to generate one or more image derivatives, e.g. using a 3×3 Sobel x-filter (or kernel) convolved with the image to generate an x-image-derivative, and using a 3×3 Sobel y-filter convolved with the image to generate a y-image-derivative. This might be done as part of executing a Canny edge detection algorithm.

Figure 9B:
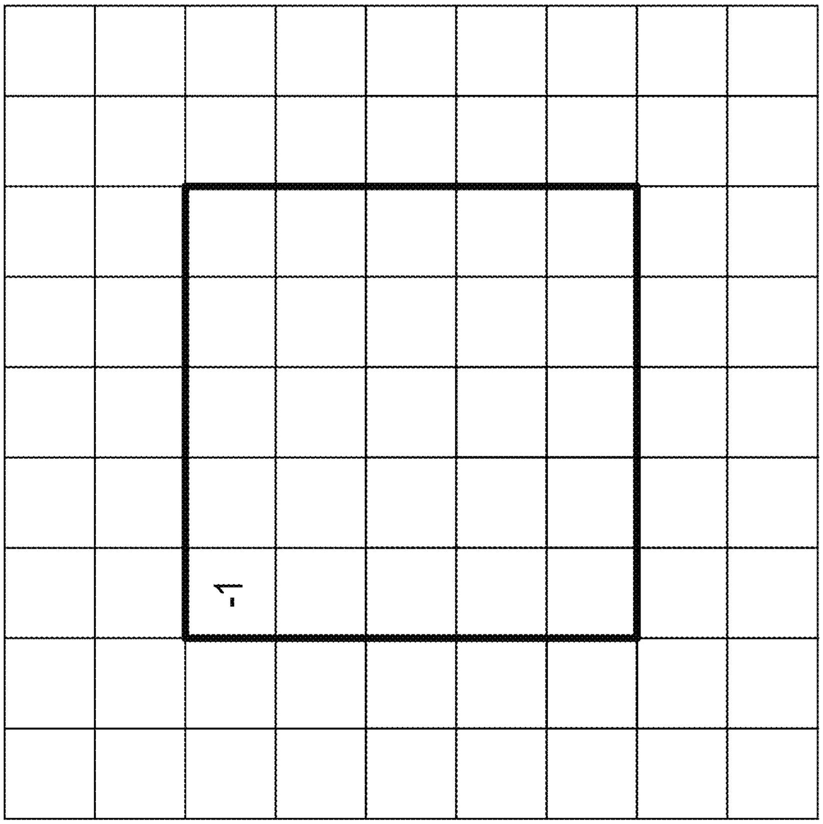

For example, FIGS. 9A-9B illustrate determination of an x-image derivative using a 3×3 Sobel x-filter for a pixel at location (3,3) in the illustrated set of pixel values. FIG. 9C illustrates calculated x-image derivatives for a plurality of pixel locations. FIG. 9D illustrates determination of a y-image derivative using a 3×3 Sobel y-filter for a pixel at location (3,3) in the illustrated set of pixel values, and FIG. 9E illustrates calculated x-image derivatives and y-image derivatives for a plurality of pixel locations.

For each pixel location, an edge gradient magnitude and direction can be determined based on a chosen function, e.g. an edge gradient magnitude can be defined for a given pixel (x,y) as sqrt (Gx(x,y)^2+Gy(x,y)^2), and an edge gradient direction can be determined for a given pixel (x,y) as tan ^−1 (Gy(x,y)/Gx(x,y)). Using these determined edge gradient magnitudes and edge gradient directions, one or more respective pixel values may be suppressed (reduced to zero) if it is determined that the respective pixel value is not a local maximum in its neighborhood in the direction of the gradient.

Subsequently, hysteresis thresholding may be utilized with a first threshold and a second threshold, where any pixels having an adjusted edge gradient value greater than the second threshold are automatically identified as an edge, while any pixels having an adjusted edge gradient value less than the first threshold are automatically identified as not being an edge. Pixels having an adjusted edge gradient value between the first threshold and the second threshold are evaluated to determine whether they are connected to a pixel that has been identified as an edge. If not, they are discarded (e.g. set to zero).

The result is a set of pixel values for the image indicating whether each corresponding pixel is an edge or not.

In accordance with one or more implementations, this resulting set of pixel values is utilized to search for closed shapes, e.g. for closed quadrangle shapes formed by pixels indicated to be an edge.

In accordance with one or more implementations, a process involves determining whether a set of determined edges (e.g. edge values producing four connected edges) match a target geometric shape (e.g. a square, or a rectangle having a certain length to width ratio).

In accordance with one or more implementations, a process involves determining a skew value indicating a skew characteristic of a marker candidate, and removing the marker candidate from a candidate list if the skew value exceeds a threshold.

In accordance with one or more implementations, a process involves determining a calculated length for one or more determined sides or edges of a candidate, and removing the marker candidate from a candidate list if the calculated length does not match a target value.

At this point, the system has determined a plurality of candidate markers, and pixel locations corresponding to those candidate markers. This includes approximate corner locations based on the pixel locations corresponding to those candidate markers.

In accordance with one or more implementations, a corner detection algorithm is utilized on a window proximate to each approximate corner location of a candidate marker to determine a more precise corner location.

In accordance with one or more implementations, a process involves analyzing, for each candidate, a 5 pixel×5 pixel window proximate to each approximate corner location (e.g. an approximate corner of a determined closed quadrangle). In accordance with one or more implementations, a process involves determining, within each 5 pixel×5 pixel window, a corner location based on calculated gradient values for pixels within the 5 pixel×5 pixel window.

In accordance with one or more implementations, a Harris corner detection algorithm is utilized to detect one or more corners of a marker. For example, the cv.cornerHarris( ) function of OpenCV may be utilized. See also A Combined Corner and Edge Detector, C. Harris and M. Stephens, Proceedings of the 4th Alvey Vision Conference, p. 147-151 (1988).

Generally, the Harris corner detection algorithm operates by considering an image patch, e.g. a 3×3 image patch with 9 pixels at locations (x1, y1), (x1, y2), (x1, y3), (x2, y1), etc. The algorithm operates based on determining a change in intensity values for a shift [u,v] (i.e. a shift by u pixels in the x direction and a shift by v pixels in the y direction). More specifically, an intensity value E(u,v) for a given shift [u,v] is determined for each pixel (x,y) in a pixel window using the formula illustrated in FIG. 10. Every pixel can be weighted equally, with the value w(x,y) set to 1 for every pixel, or a Gaussian filter can be utilized to weight some pixels more heavily. l(x,y) is an intensity value determined for pixel (x,y), while l(x+u, y+v) is the intensity value for a shifted window.

The Harris corner detection algorithm operates based on maximizing this function to detect corners. As illustrated in FIG. 10, through Taylor series expansion, this can be worked out to be E(u,v)~[u v]M [[u] [v]], where M is a matrix that represents a weighted summing of matrices determined for pixels within a window. These matrices that are summed each represent a weighted matrix for a respective pixel within the window that has values based on x and y image derivative values for that respective pixel.

Figure 11:
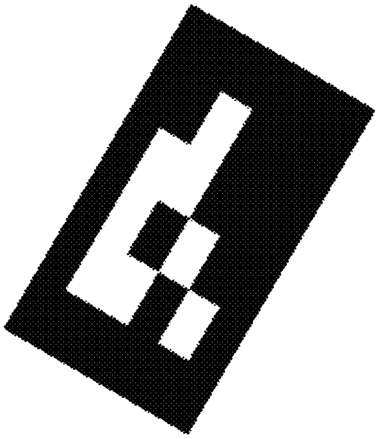
Figure 12:
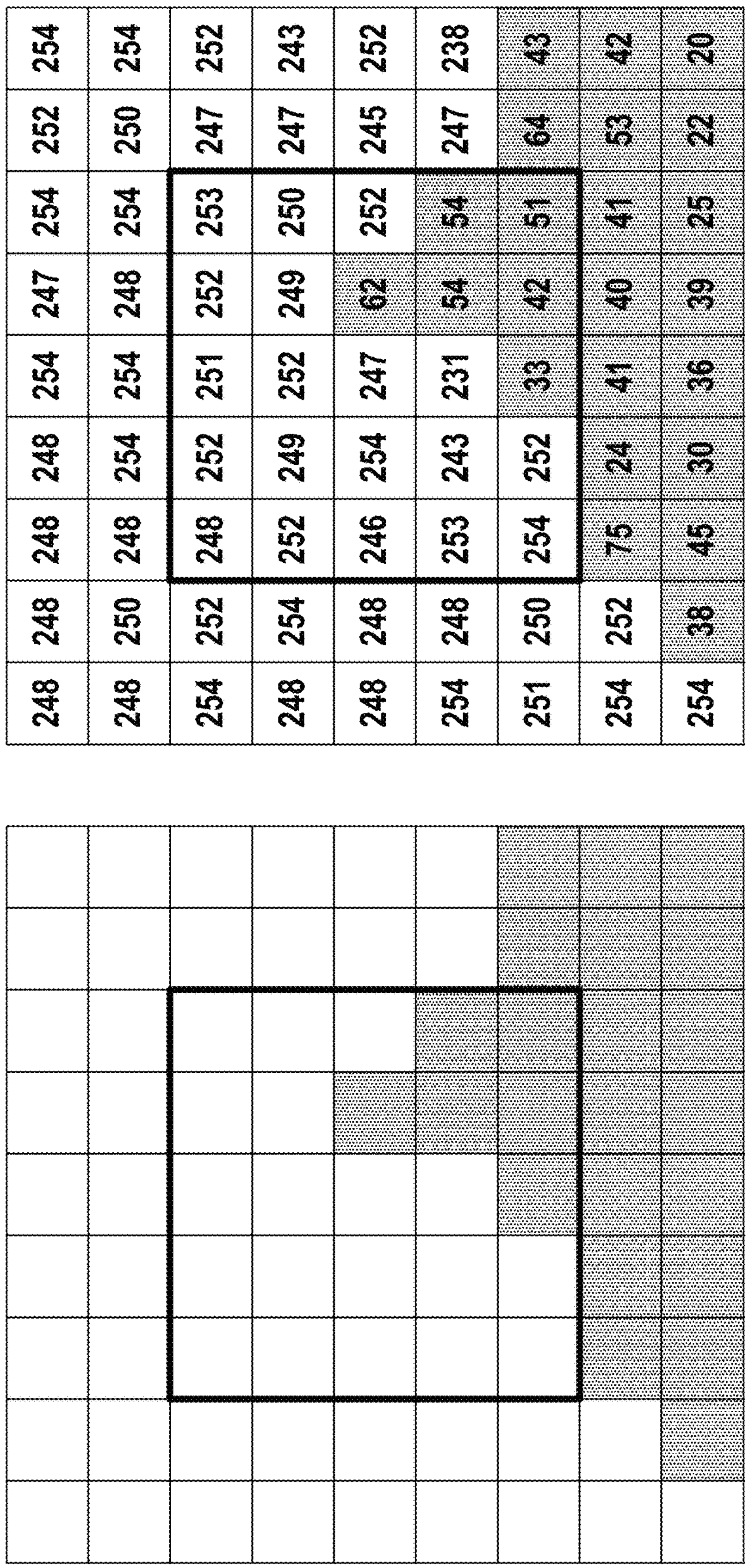
Figure 14:
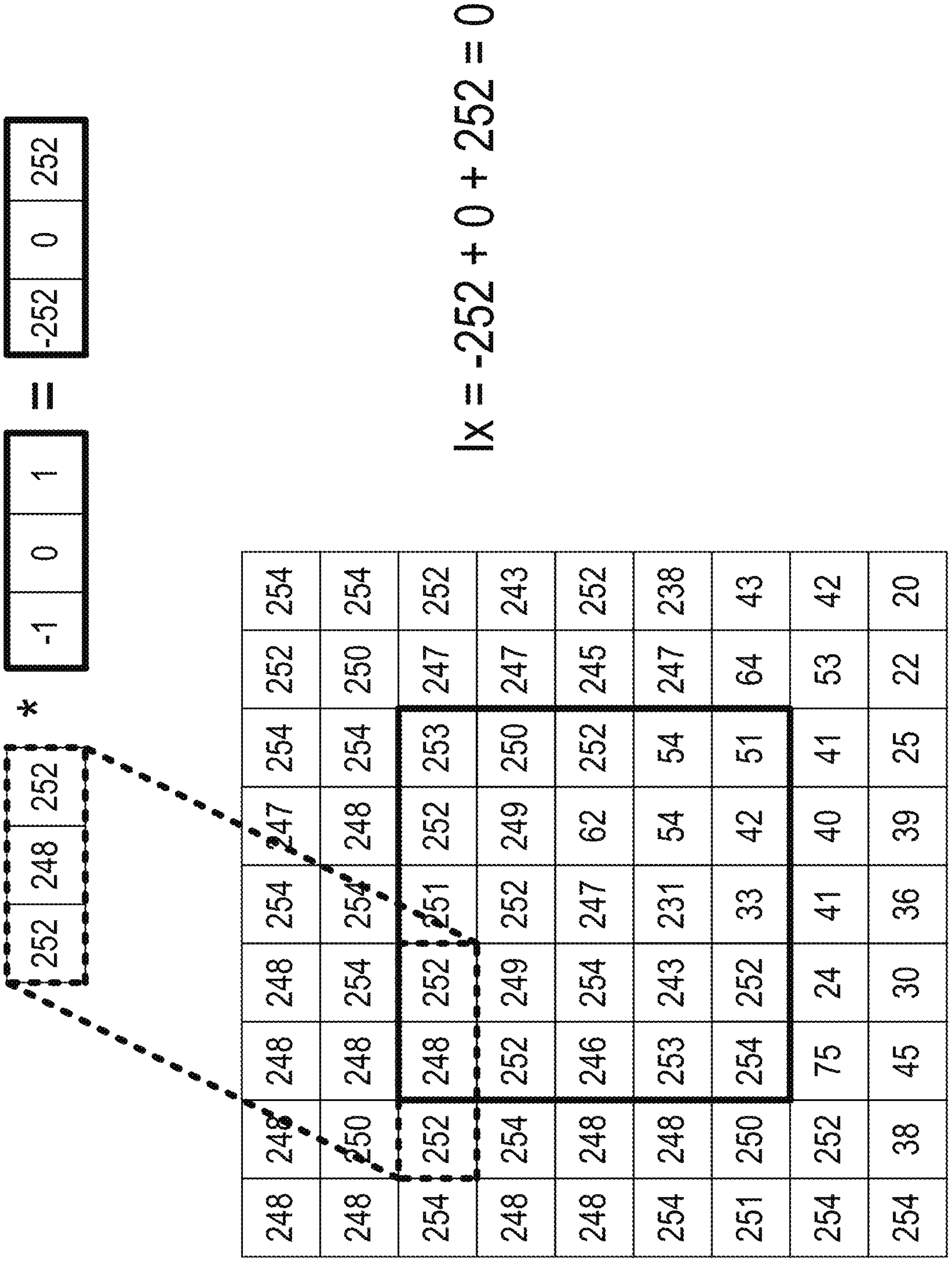
Figure 15:
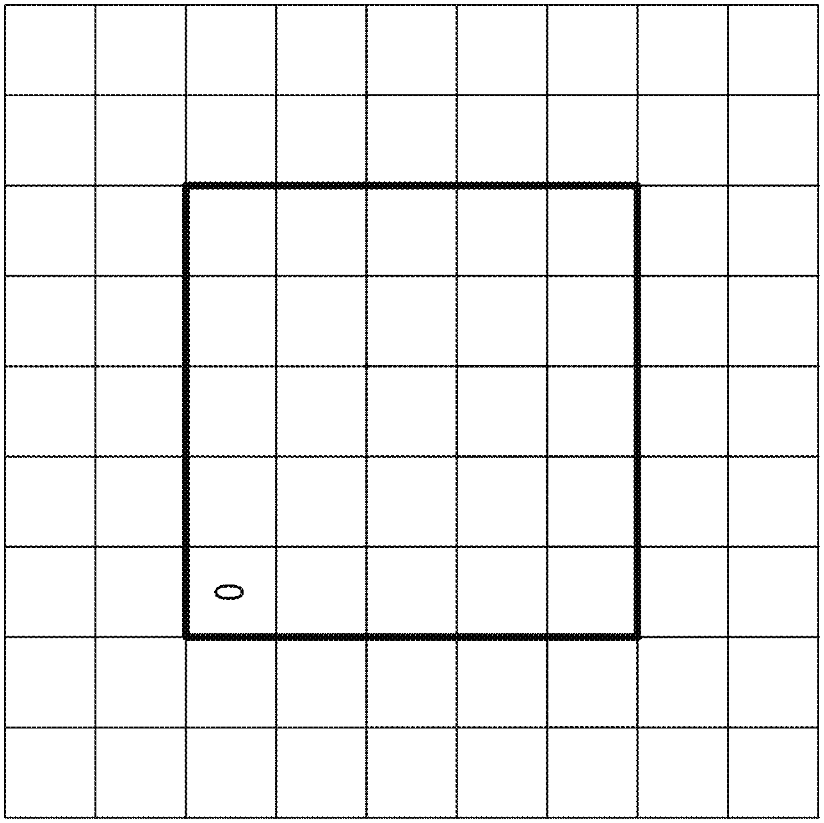
Figure 16:
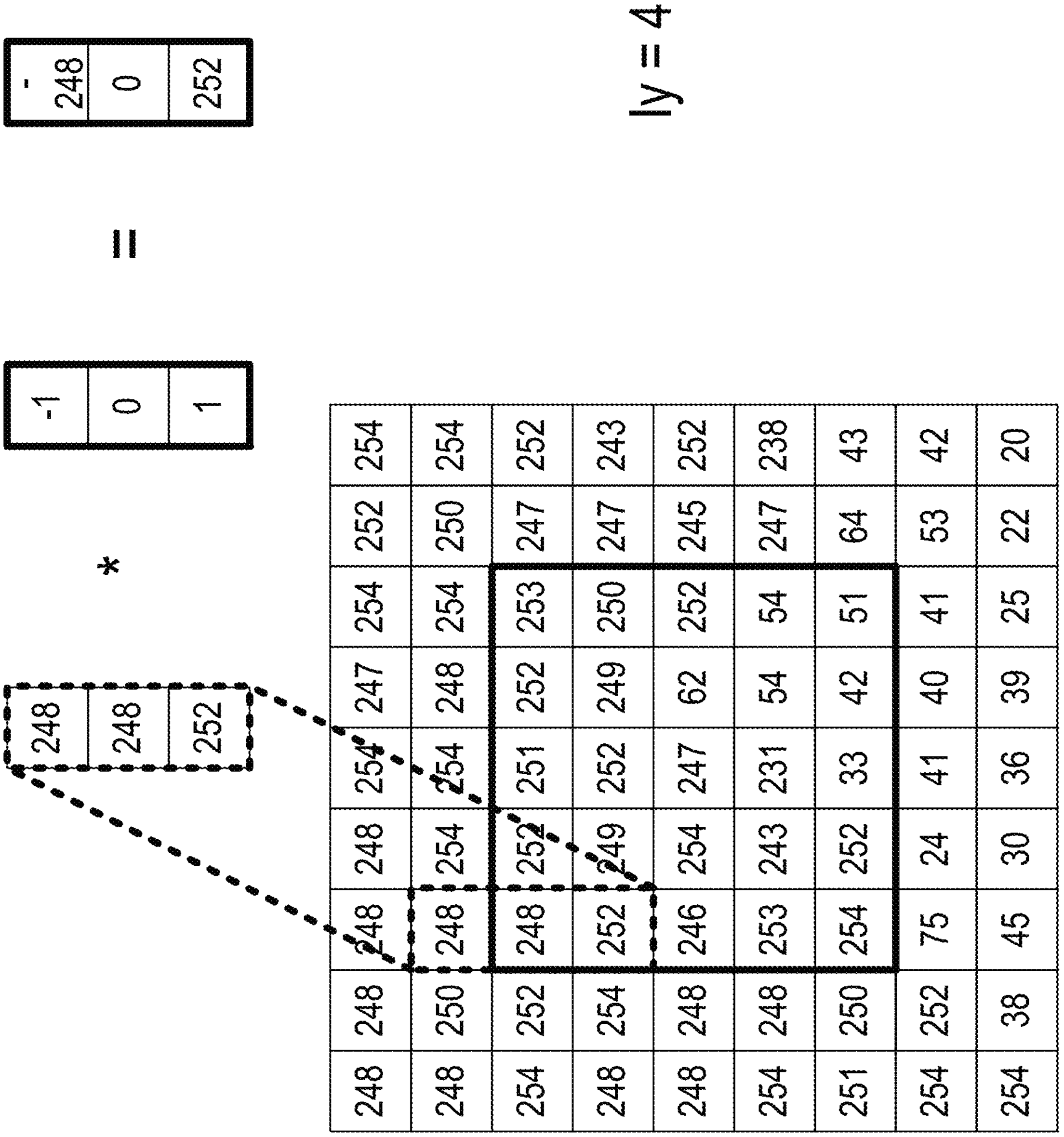

As an example, FIG. 11 illustrates an exemplary image of a marker. FIG. 12 illustrates on the left a zoomed in portion of that image depicting pixels of that image. FIG. 12 illustrates on the right the same thing, overlaid with greyscale pixel values for the portion of the image. FIG. 13 illustrates a simple x-filter for use in determining a set of pixel values representing an x-image-derivative for the portion of the image. FIGS. 14-15 illustrate determination of a x-image derivative using this x-filter for a pixel at location (3,3) in the illustrated set of pixel values. FIG. 16 illustrates calculated x-image derivatives for a plurality of pixel locations. FIG. 17 illustrates determination of a y-image derivative using a y-filter for a pixel at location (3,3) in the illustrated set of pixel values, and FIG. 18 illustrates calculated x-image derivatives and y-image derivatives for a plurality of pixel locations.

In accordance with one or more implementations, to facilitate processing, grayscale values may be scaled prior to further processing. As a simple example, the grayscale values between 0 and 255 illustrated in FIG. 12 may be scaled by dividing them by 255, to produce a set of values between 0 and 1, as illustrated in FIG. 19.

X-image-derivative values and y-image-derivative values may then be generated for each pixel location, as illustrated in FIG. 20.

As noted above, the Harris corner detection algorithm involves use of a matrix M that represents a weighted summing of matrices determined for pixels within a window. These matrices that are summed each represent a weighted matrix for a respective pixel within the window that has values based on x and y image derivative values for that respective pixel. In particular, these values are based on (1) an Ix^2 value calculated based on squaring the x-image-derivative value for a pixel, (2) an ly^2 value calculated based on squaring the y-image derivative value for a pixel, and (3) an lxly value calculated based on multiplying the x-image-derivative value for a pixel by the y-image-derivative value for the pixel. FIG. 21 illustrates these values calculated for each pixel location.

But, as just noted, the matrix M represents a weighted summing of matrices determined for pixels within a window. These matrices that are summed each represents a weighted matrix for a respective pixel within the window that has values based on x and y image derivative values for that respective pixel. This weighting may be uniform (e.g. a weight value of one for all pixels within a window), Gaussian, etc. Thus, to determine the values for the matrix M, the corresponding lx^2 values, ly^2 values, and lxly values for pixels within the window can be summed.

For example, for the pixel location corresponding to location (2,2) in the pixel locations illustrated in FIG. 20 (which was location (3,3) in some prior illustrations depicting an additional row and column), a matrix M can be determined with a summed lx^2 value representing a summation of all the lx^2 values for every pixel in a 3×3 window centered on the pixel at location (2,2). FIG. 21 illustrates that a summed lx^2 value for a pixel is determined based on lx^2 values for a 3×3 pixel window surrounding that pixel.

Similarly, the matrix M can use a summed ly^2 value representing a summation of all the ly^2 values for every pixel in a 3×3 window centered on the pixel at location (2,2), and the matrix M can use a summed lxly value representing a summation of all the lxly values for every pixel in a 3×3 window centered on the pixel at location (2,2). This same approach can be taken to determine a matrix M for a plurality of pixels, e.g. all pixels in a 5×5 pixel area or window. FIG. 22 illustrates, for pixels (e.g. pixel locations) in a 5×5 pixel area, summed lx^2, summed lx^y, and summed lxly values determined based on a 3×3 pixel window.

The Harris corner detection algorithm uses a score function that can be computed for a respective pixel (e.g. a respective pixel location) based on this matrix M for that respective pixel. The algorithm leverages values that can be determined based on eigenvalues of the matrix M.

In particular, this score function utilizes a determinant value, which represents a first eigenvalue multiplied by a second eigenvalue, and a trace value, which represents the first eigenvalue multiplied by the second eigenvalue.

For a matrix [[a b] [c d]], the determinant value can be calculated as a*d−b*c. Thus, for the matrix M, this is lx^2*ly^2−lxly*lxly. For a matrix [[a b] [c d]], the trace value can be calculated as a+d.

FIG. 23 illustrates, for pixels (e.g. pixel locations) in a 5×5 pixel area, determinant and trace values determined based on the matrix M for each pixel location, e.g. based on the summed lx^2, summed lx^y, and summed lxly values.

Figure 24:
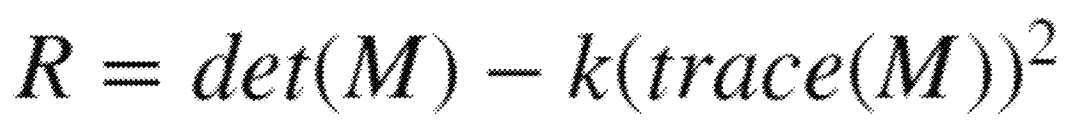

FIG. 24 illustrates an exemplary score function for the Harris corner detection algorithm that computes a score for a pixel based on determinant and trace values calculated for that pixel. The score function utilizes a constant, k, that can be empirically determined, e.g. based on testing. This value is frequently set to around 0.04, but it is also sometimes set to a value between 0.02 and 0.04 or a value between 0.04 and 1.

FIG. 25 illustrates exemplary scores calculated using this score function and the calculated determinant and trace values of FIG. 23. In particular, FIG. 23 illustrates, for pixels (e.g. pixel locations) in a 5×5 pixel area, score values determined based on the determinant and trace values for the matrix M for each pixel location.

Generally, when the absolute value of the score for a pixel (or pixel location) is small, which happens when the first and second eigenvalues for the matrix M determined for that pixel are small, the pixel does not correspond to a corner or edge, when the value of the score for a pixel (or pixel location) is less than zero, which happens when one of the eigenvalues for the matrix M determined for that pixel is much greater than the other eigenvalue, the pixel corresponds to an edge, and when the score for a pixel (or pixel location) is large, which happens when the eigenvalues for the matrix M determined for that pixel are large and around the same size, the pixel corresponds to a corner.

Figure 26:
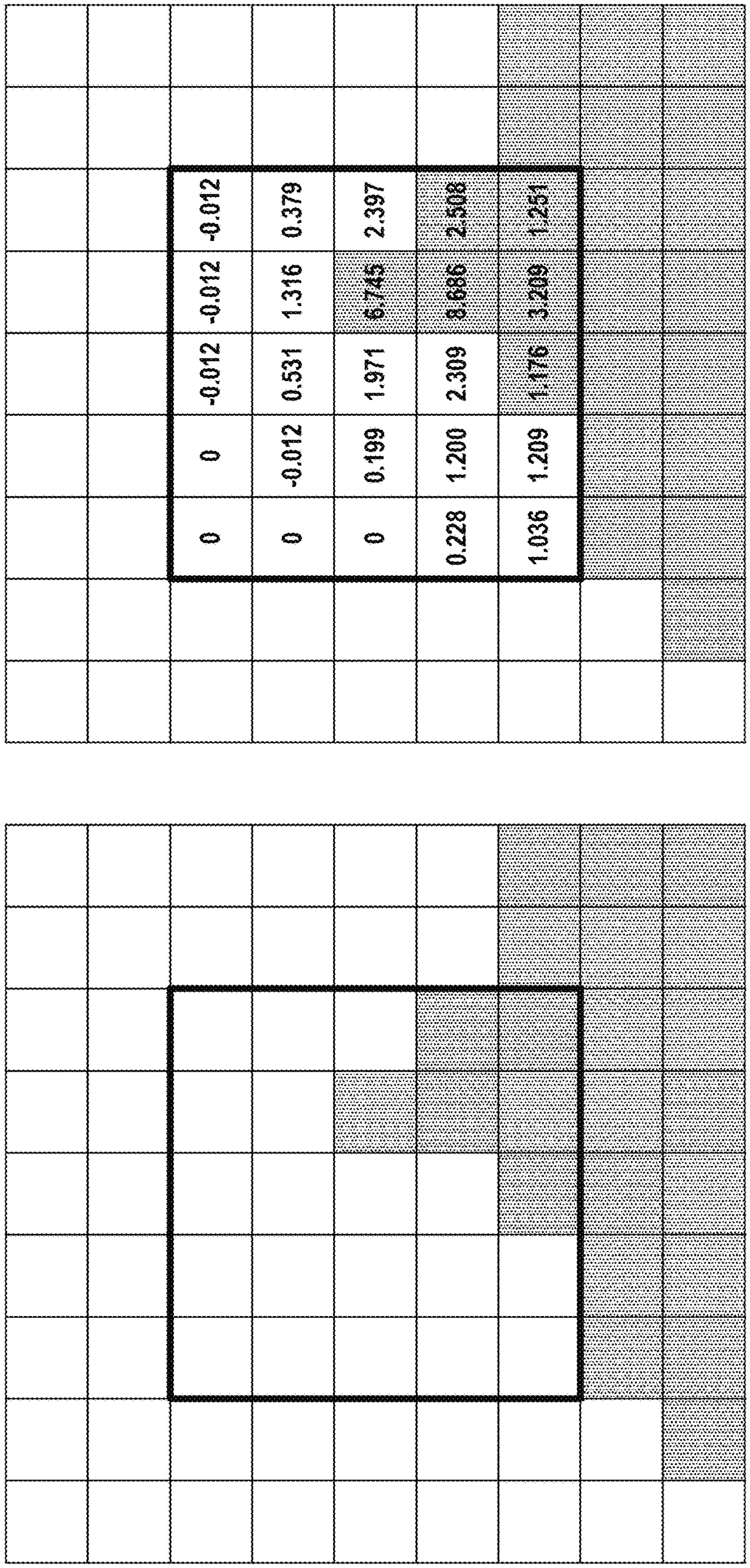

FIG. 26 illustrates calculated score values overlaid onto grayscale pixels of a portion of an image. The higher values suggest presence of a corner. In accordance with one or more implementations, a highest value within a considered area, region, or window (e.g. a 5×5 region), is determined to be the corner location as part of a more precise corner detection approach. It will be appreciated that, in FIG. 26, the highest value may not actually correspond to a true corner of the marker that is depicted in the image.

Figure 27:
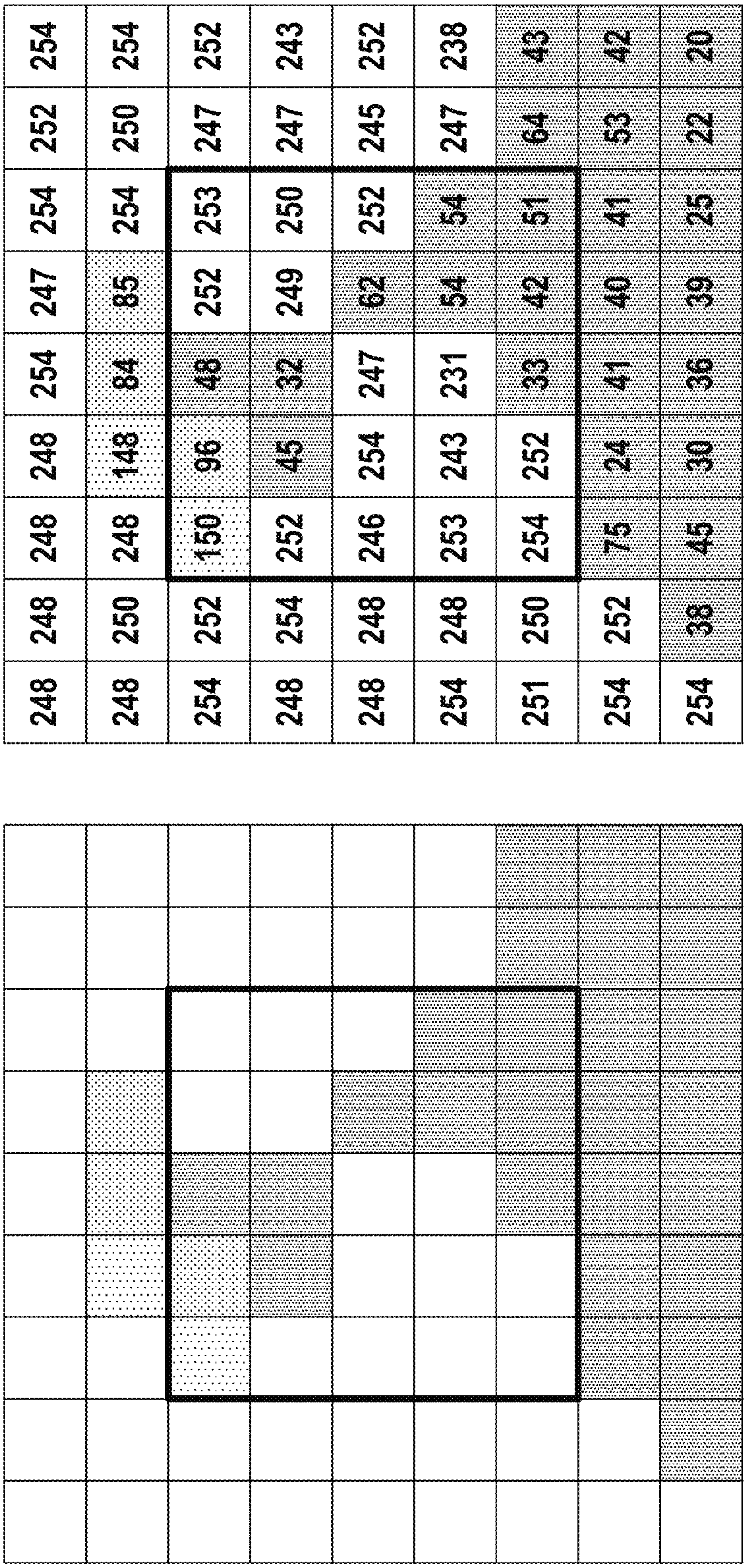

As another example, FIG. 27 illustrates an exemplary image of a marker in accordance with one or more implementations that includes a gradient feature 112 extending from a corner thereof with a gradient pattern. FIG. 27 illustrates on the left a zoomed in portion of that image depicting pixels of that image. FIG. 27 illustrates on the right the same thing, overlaid with greyscale pixel values for the portion of the image.

FIG. 28 illustrates exemplary scores calculated using the same approach just described with respect to an image of a marker without a gradient feature 112. In particular, FIG. 28 illustrates, for pixels (e.g. pixel locations) in a 5×5 pixel area, score values determined based on the determinant and trace values for the matrix M for each pixel location.

Figure 29:
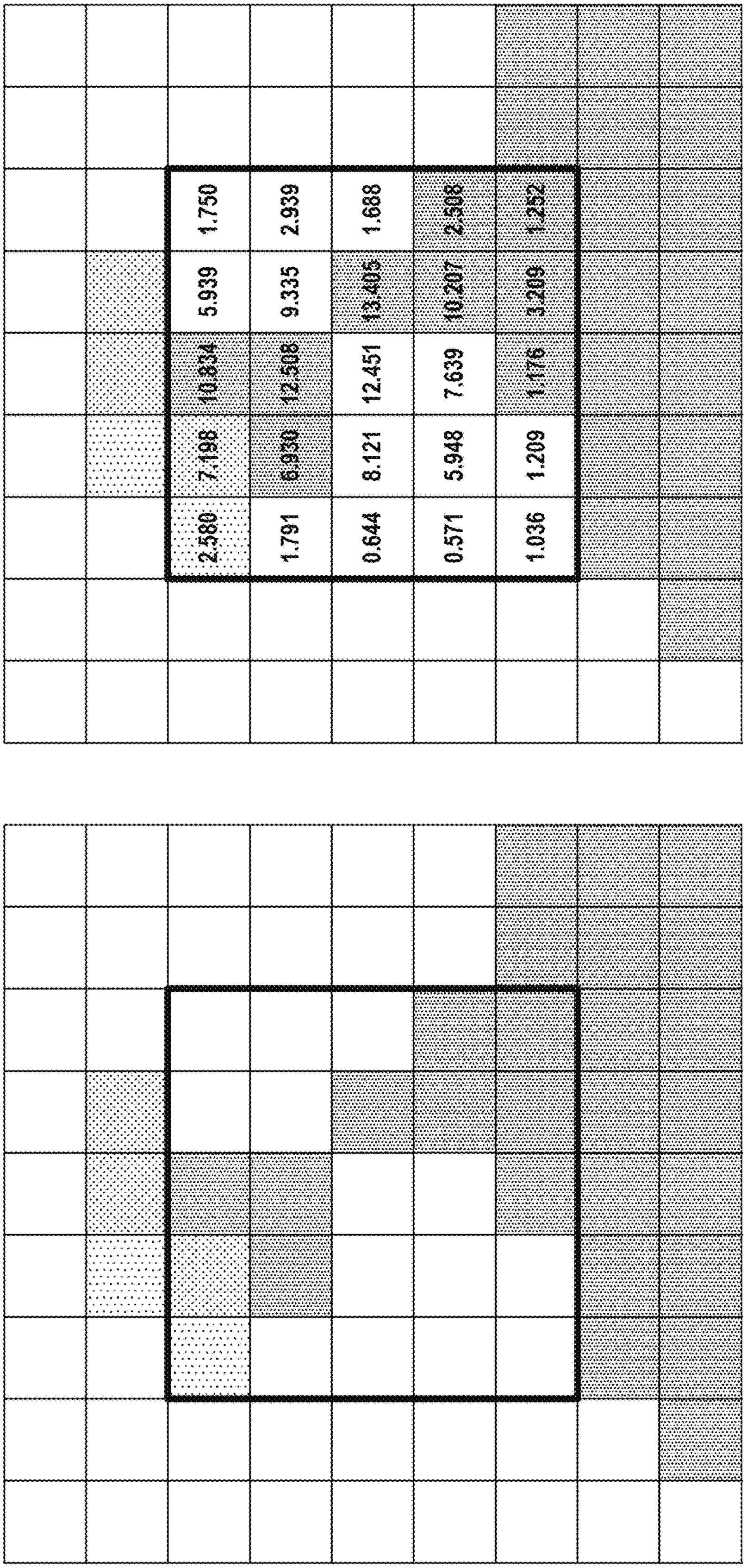
Figure 30:
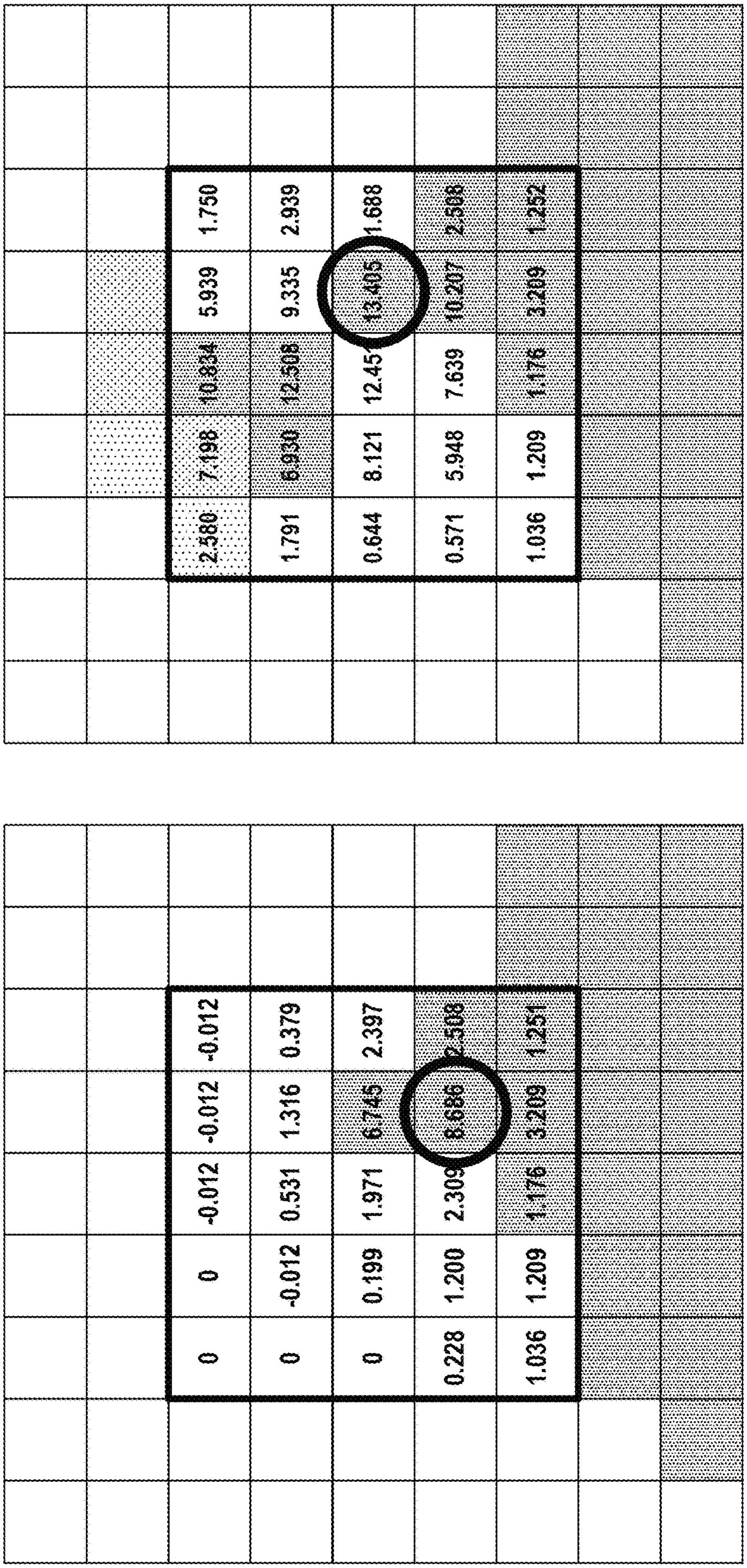

FIG. 29 illustrates calculated score values overlaid onto grayscale pixels of a portion of the image. The higher values suggest presence of a corner. In accordance with one or more implementations, a highest value within a considered area, region, or window (e.g. a 5×5 region), is determined to be the corner location as part of a more precise corner detection approach. It will be appreciated that, in FIG. 29, the highest value appears to actually correspond to a true corner of the marker that is depicted in the image. This contrasts with the results for the image of a marker without a gradient feature 112 previously detailed, as illustrated in FIG. 30, where circles highlight the highest determined values within a 5×5 region.

Figure 31:
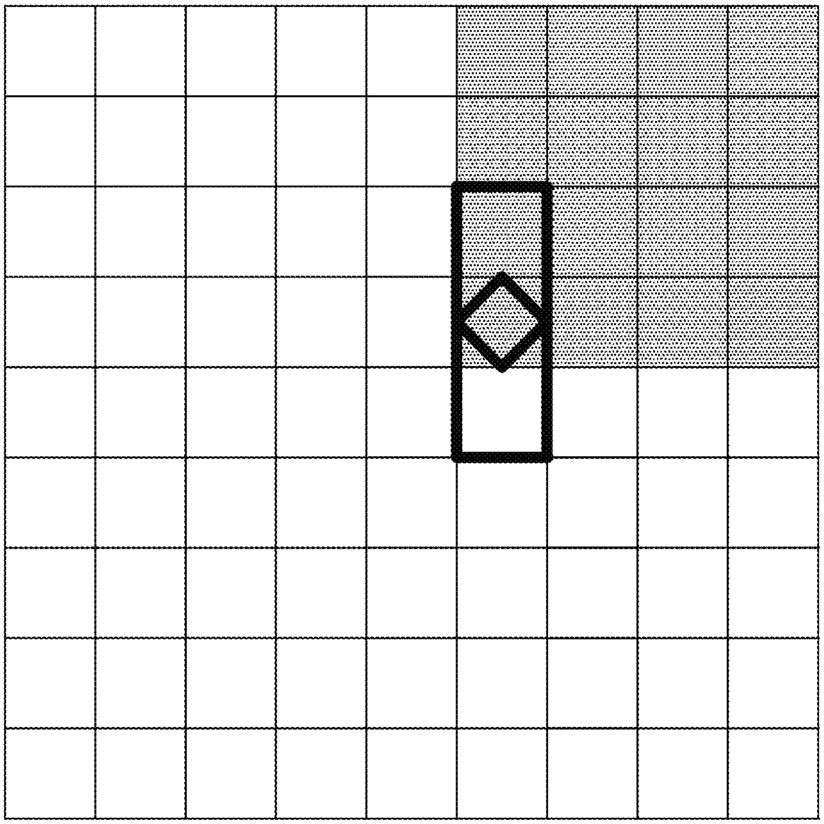

To help illustrate why in some circumstances use of a gradient feature 112 can help improve corner detection using a corner detection algorithm that uses x and y image derivative values, consider the illustration in FIG. 31 of an idealized image depicting a corner of a marker. The figure illustrates calculation of an x image derivative value for a respective pixel based on pixels on either side of the respective pixel. It will be appreciated that for a standard x-filter, e.g. [−1 0 1], the result would be large in this case given the value difference between a light pixel and a dark pixel.

Figure 32:
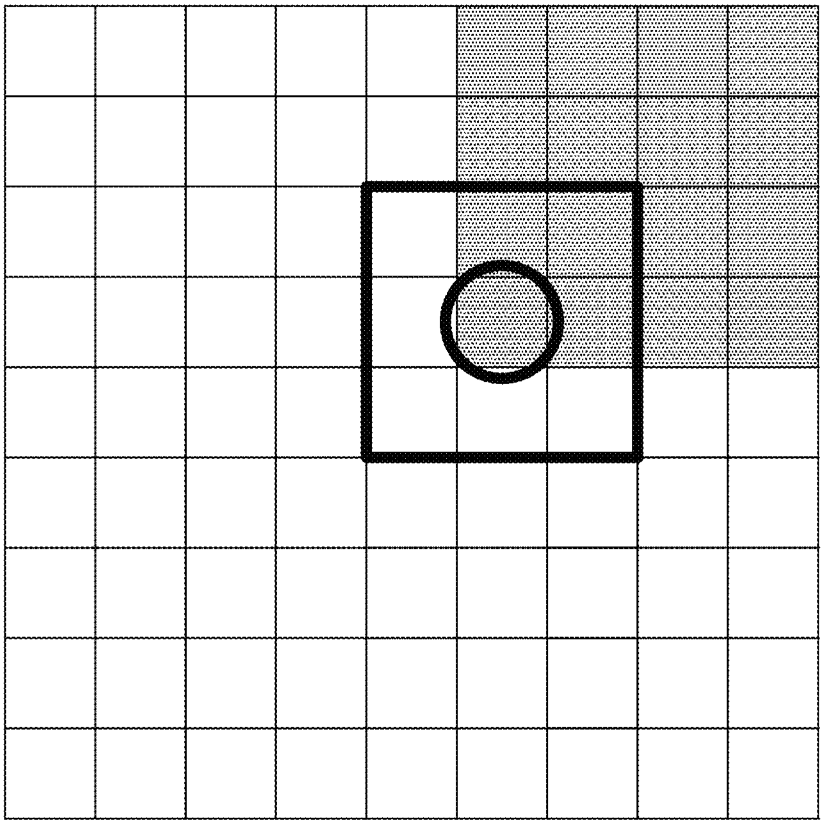
Figure 33:
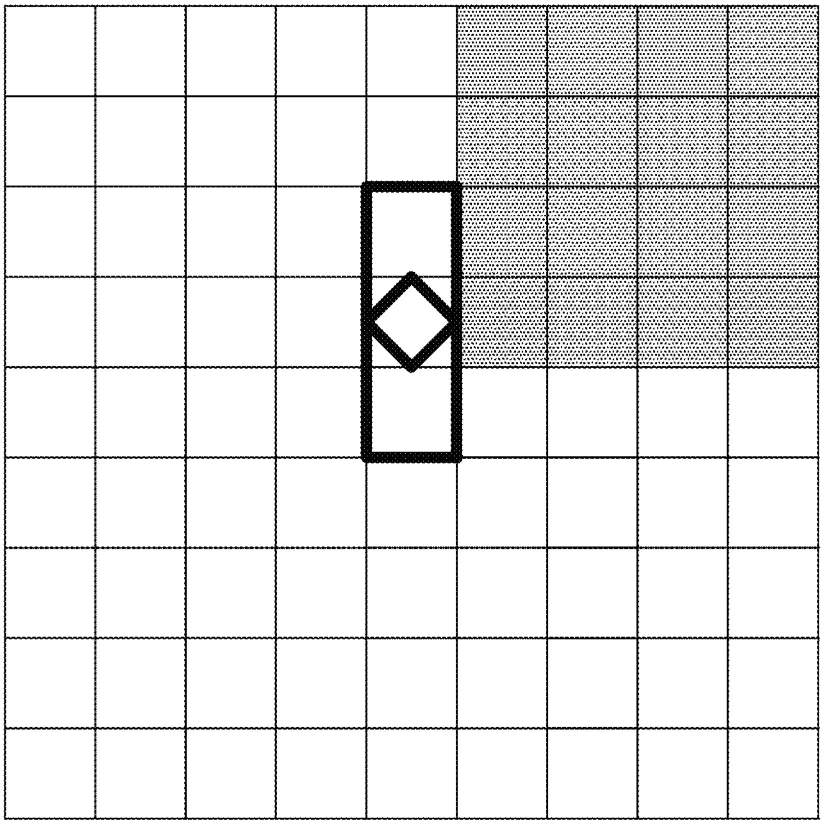
Figure 34:
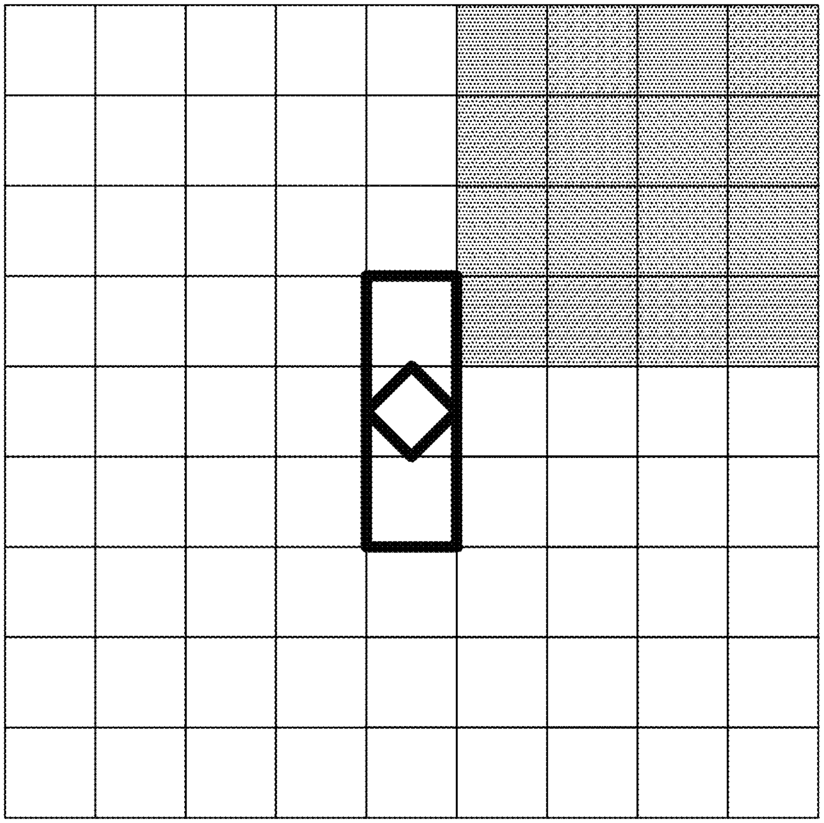
Figure 35:
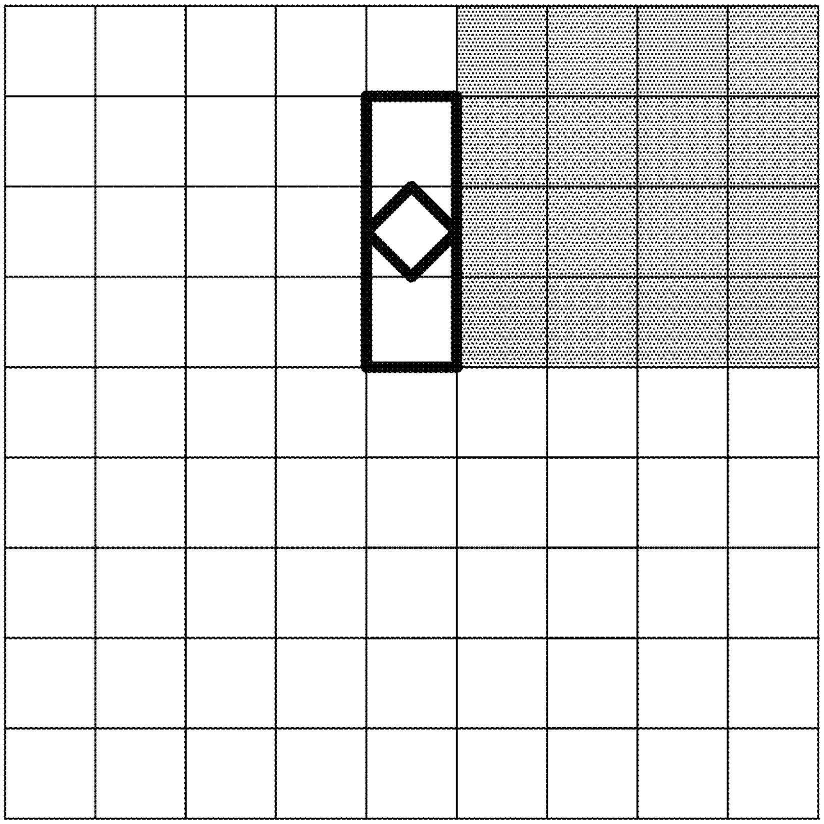
Figure 36:
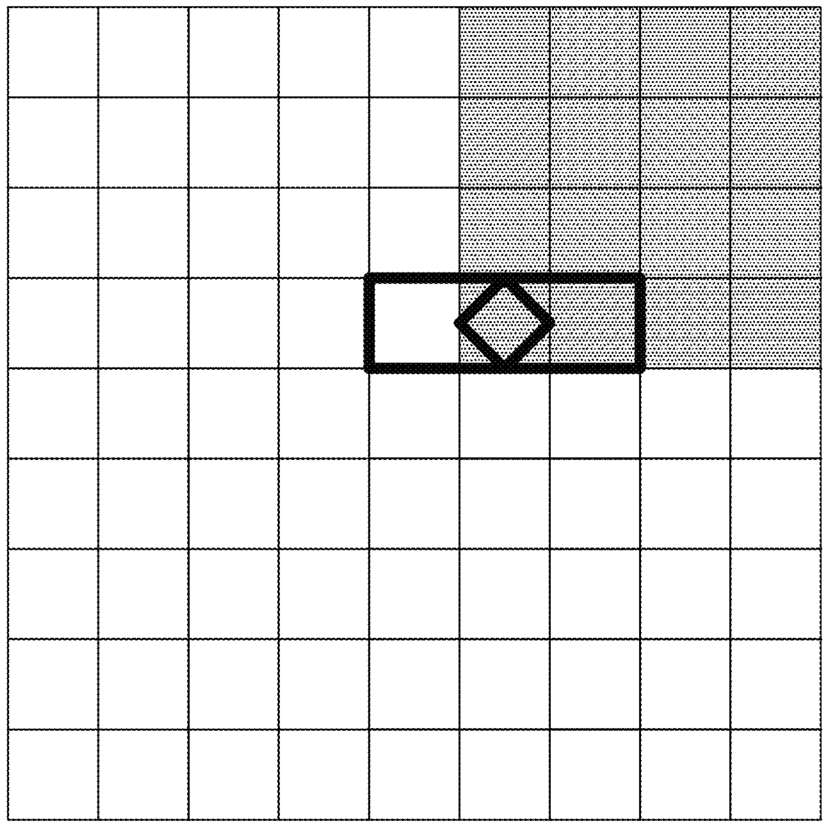
Figure 37:
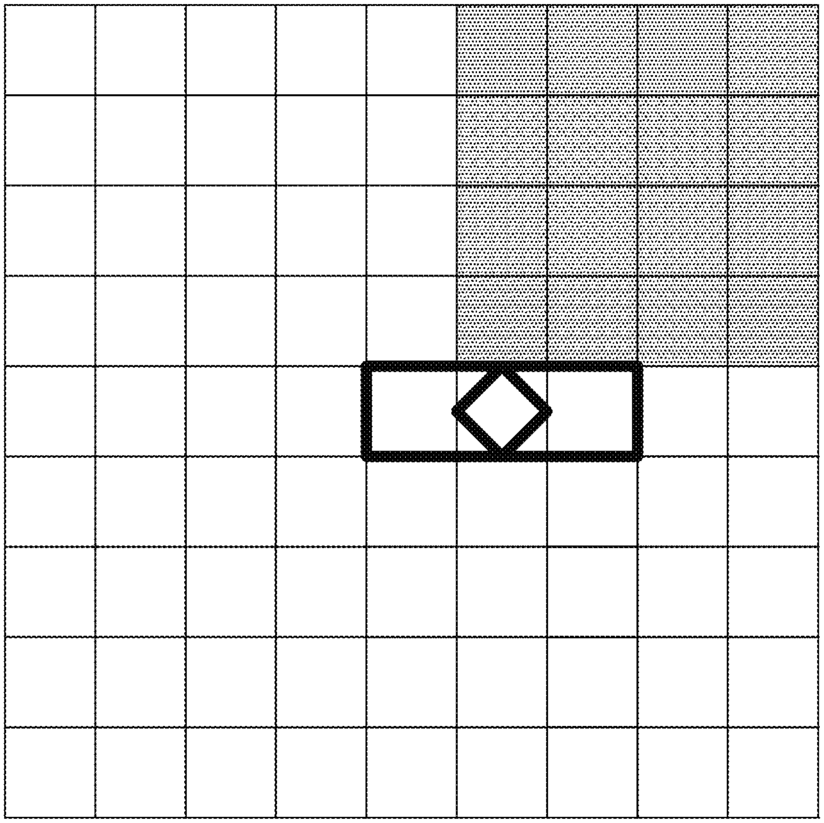
Figure 38:
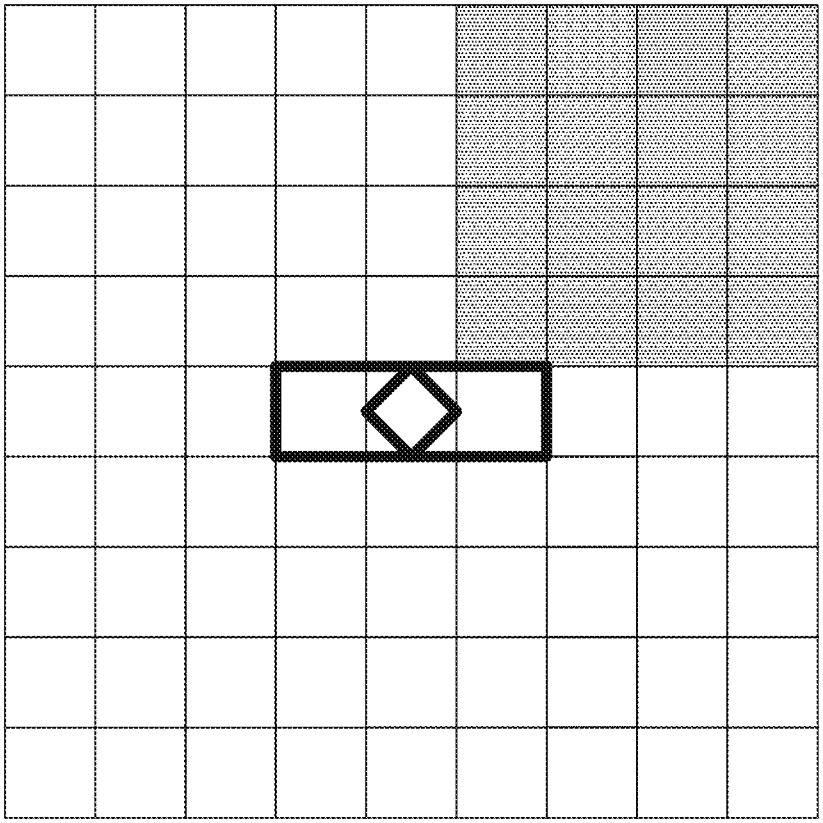

If a score for the respective pixel is based on image derivative values for pixels within a window around the respective pixel, as illustrated in FIG. 32, then the score is impacted by image derivative values that are low, such as those illustrated in FIGS. 33-35. The same holds true for y image derivative values. While the y image derivative value is illustrated in FIG. 36, it would be low for the pixels illustrated in FIGS. 37 and 38.

Figure 39:
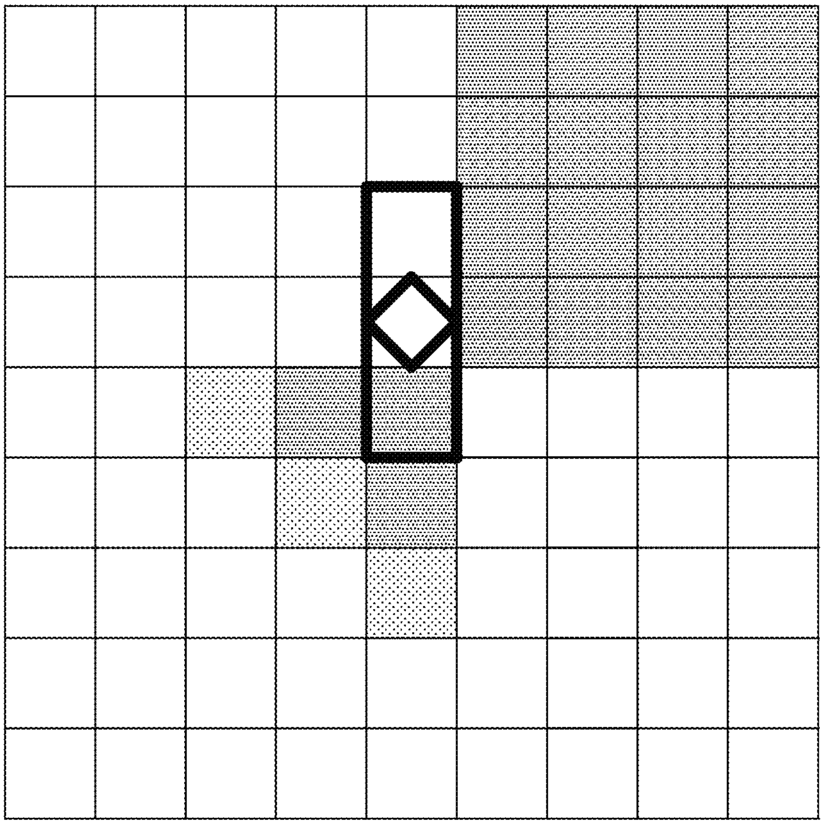
Figure 40:
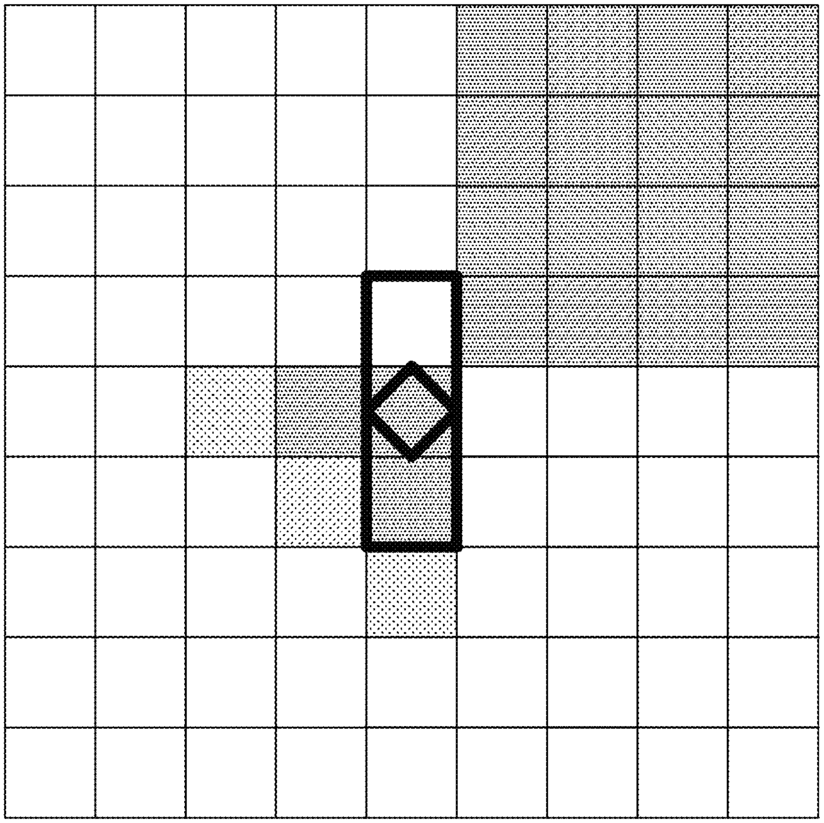
Figure 41:
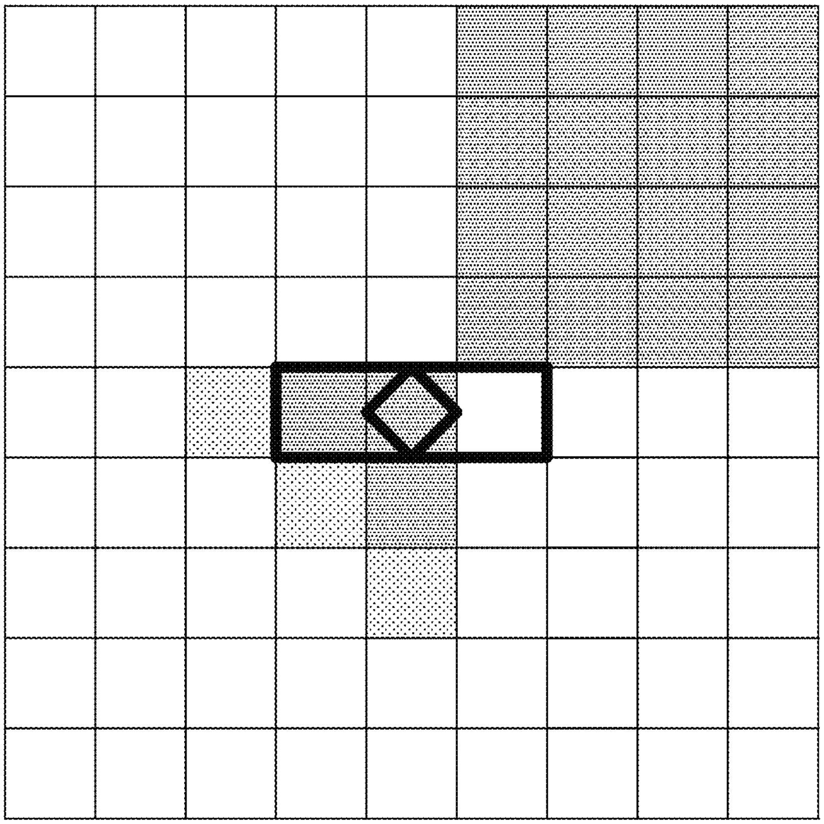
Figure 42:
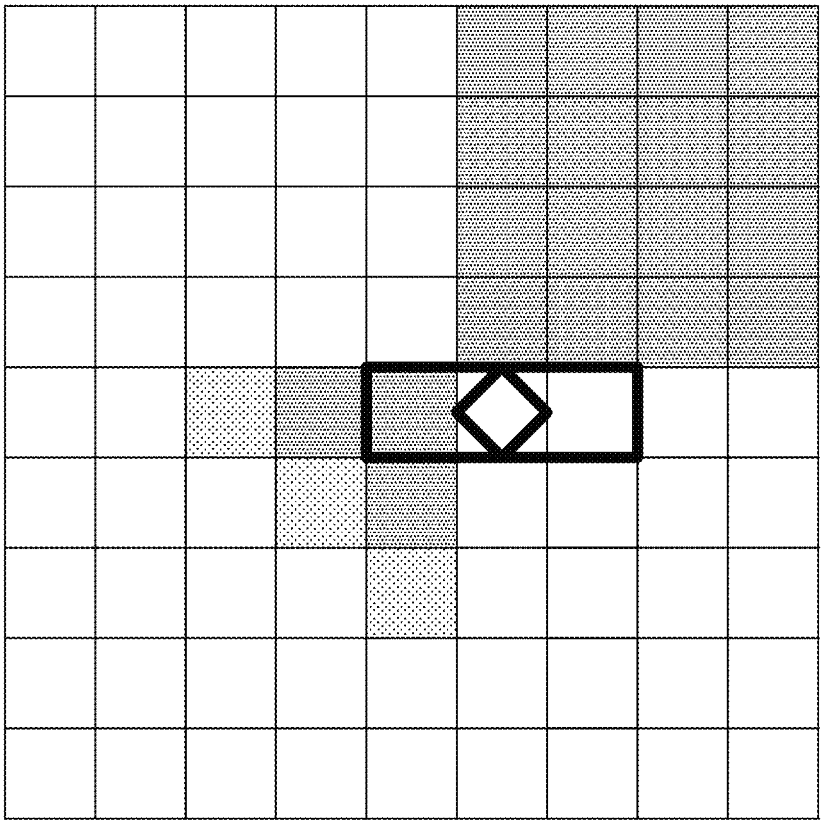
Figure 43:
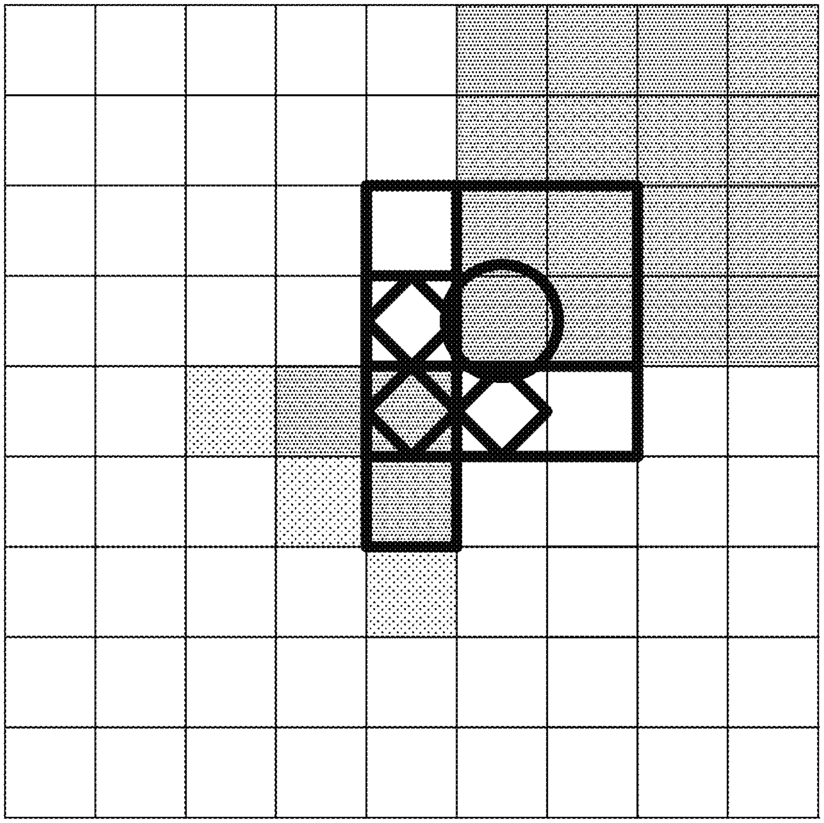

In contrast to this, if a gradient feature 112 is added to the marker, as illustrated in FIG. 39, x image derivative and y image derivative values for some of these pixel locations may now be larger, as illustrated in FIGS. 39-43. The result is that a calculated score for the respective pixel is higher based on larger (either positive or negative) image derivative values for pixels within a window around the respective pixel. The negative sign on some of these values does not necessarily negatively impact the calculated score because many approaches utilize squaring along the way, e.g. sum lx^2 values and ly^2 values for pixels within a 3×3 window as described hereinabove.

In accordance with one or more implementations, once four precise corners of a marker are determined, pixels of the image are warped, e.g. with a transform, to fit a flat, square area, and then the marker is decoded.

The discussion with respect to FIGS. 9A-9E and 10 through 43 describes techniques for edge and corner detection involving deterministic algorithms, such as a Sobel operator and a Harris corner detection algorithm (or a variation thereof). In other implementations non-deterministic systems may be used in conjunction with the HPOT 110. For example, a trained machine learning system, such as a trained neural network, may be used to determine the location of tag corners 204 in the image data 156. In yet another example, a combination system may be used to process the HPOTs 110 that combines deterministic and non-deterministic operations.

The processes and methods discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage medium may include, but is not limited to, hard drives, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, physical spaces, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. A method comprising:

acquiring, using a camera of a device, image data;

detecting a first gradient feature that transitions from a first color to a second color in the image data;

determining a first edge proximate to the first gradient feature;

determining a second edge proximate to the first gradient feature; and determining a first corner of a tag based on gradient values determined for pixels of the image data proximate the first edge, the second edge, and the first gradient feature;

wherein the first gradient feature is external to the tag.

2. The method of claim 1, further comprising:

determining at least a first boundary of the tag, based on the determining the first corner of tag.

3. The method of claim 1, further comprising:

detecting a second gradient feature in the image data;

determining that the second edge is proximate to the second gradient feature;

determining a third edge proximate to the second gradient feature;

determining a second corner of the tag based on gradient values determined for pixels of the image data proximate to the second edge, the third edge, and the second gradient feature, wherein the second gradient feature is external to the tag;

detecting a third gradient feature in the image data;

determining that the first edge is proximate to the third gradient feature;

determining a fourth edge proximate to the third gradient feature;

determining a third corner of the tag based on gradient values determined for pixels of the image data proximate to the first edge, the fourth edge, and the third gradient feature, wherein the third gradient feature is external to the tag;

detecting a fourth gradient feature in the image data;

determining that the third edge and fourth edge are proximate to the fourth gradient feature; and determining a fourth corner of the tag based on gradient values determined for pixels of the image data proximate to the third edge, the fourth edge, and the fourth gradient feature;

wherein the fourth gradient feature is external to the tag.

4. The method of claim 1, further comprising:

detecting a supplemental gradient feature, wherein the supplemental gradient feature is located between the first corner of the tag and an adjacent corner of the tag, and wherein the supplemental gradient feature has a supplemental point located on a perimeter of a boundary of the tag between the first corner of the tag and the adjacent corner of the tag.

5. The method of claim 1, further comprising:

determining pose data for the device, based on the determining the first corner of the tag, wherein the pose data indicates a distance and an angle of the camera relative to the tag.

6. The method of claim 1, further comprising:

determining, based on the image data, a set of gradient values, each gradient value of the set of gradient values being associated with a location with respect to the image data, and the each gradient value of the set of gradient values being determined based on pixel values for two or more adjacent pixels of the image data;

identifying, based on the set of gradient values, the first edge and the second edge; and determining, based on the identifying the first edge and the second edge, a pixel window to use to search for the first corner of the tag;

wherein the first corner of the tag is determined based on the pixel window.

7. The method of claim 1, further comprising:

detecting a first plurality of elements of the tag;

determining that the first plurality of elements encode first data; and decoding the first data to determine a tag identifier.

8. The method of claim 1, further comprising:

detecting a first plurality of elements of the tag;

wherein: each element of the first plurality of elements comprises a square having a color selected from a set of colors comprising the first color and the second color, the each element of the first plurality of elements has a length and width corresponding to a first distance, the first gradient feature comprises a second plurality of elements, each element of the second plurality of elements comprising a square having a length and width corresponding to a second distance, and the second distance is less than the first distance.

9. The method of claim 1, further comprising:

detecting a first plurality of elements of the tag;

wherein:

each element of the first plurality of elements comprises a polygon having a side corresponding to a first distance, the first gradient feature comprises a second plurality of elements arranged in a first gradient pattern, each element of the second plurality of elements comprises a polygon having a side corresponding to a second distance, and the second distance is less than the first distance.

10. The method of claim 1, further comprising:

detecting a first plurality of elements of the tag;

wherein:

the tag is a rectangle, and each element of the first plurality of elements is a rectangle.

11. The method of claim 1, further comprising:

detecting a first plurality of elements of the tag;

wherein:

one of the first plurality of elements at the first corner has the first color, and the first gradient feature transitions from the first color proximate to the first corner to the second color distal to the first corner.

12. A system comprising:

a camera;

one or more memories storing computer-executable instructions; and one or more hardware processors to execute the computer-executable instructions to:

acquire image data using the camera;

detect a first gradient feature that transitions from a first color to a second color; and determine a first corner of a tag proximate to the first gradient feature, wherein the first gradient feature is external to the tag.

13. The system of claim 12, the one or more hardware processors to further execute the computer-executable instructions to:

determine at least a first boundary of the tag, based on determining the first corner of the tag.

14. The system of claim 12, the one or more hardware processors to further execute the computer-executable instructions to:

detect a second gradient feature of the tag;

determine a second corner of the tag proximate to the second gradient feature;

detect a third gradient feature of the tag;

determine a third corner of the tag proximate to the third gradient feature;

detect a fourth gradient feature of the tag;

determine a fourth corner of the tag proximate to the fourth gradient feature of the tag; and determine one or more boundaries of the tag, based on the first corner, the second corner, the third corner, and the fourth corner of the tag.

15. The system of claim 12, the one or more hardware processors to further execute the computer-executable instructions to:

determine pose data, based on determining the first corner of the tag, wherein the pose data indicates a distance and an angle of the camera relative to the tag.

16. The system of claim 12, the one or more hardware processors to further execute the computer-executable instructions to:

detect a first plurality of elements of the tag;

determine that the first plurality of elements encode first data; and decode the first data to determine a tag identifier.

17. The system of claim 12, the one or more hardware processors to further execute the computer-executable instructions to:

determine, based on the image data, a set of gradient values, each gradient value of the set of gradient values being associated with a location with respect to the image data, and the each gradient value of the set of gradient values being determined based on pixel values for two or more adjacent pixels of the image data;

identify, based on the set of gradient values, two edges of the tag near the first corner and two edges of the first gradient feature near the first corner; and determine, based on the identifying the two edges of the tag near the first corner and the two edges of the first gradient feature near the first corner, a pixel window to use to search for the first corner of the tag;

wherein the first corner of the tag is determined based on the pixel window.

18. A method comprising:

acquiring, using a camera of a device, image data;

detecting a first gradient feature in the image data; and determining a first corner of a tag based on the first gradient feature, wherein the first gradient feature is external to the tag.

19. The method of claim 18, further comprising:

determining one or more boundaries of the tag, based on the determining the first corner of the tag.

20. The method of claim 18, wherein:

the first gradient feature comprises a plurality of elements arranged in a gradient pattern, and the gradient pattern transitions from a first color to a second color.

* * * * *